United States Patent
Lenz et al.

(10) Patent No.: US 11,070,114 B2
(45) Date of Patent: Jul. 20, 2021

(54) SHAFT-GROUNDING RING

(71) Applicant: KACO GmbH + Co. KG, Heilbronn (DE)

(72) Inventors: Roland Lenz, Untereisesheim (DE); Wilhelm Wunder, Beilstein (DE); Jochen Bantel, Bretzfeld (DE); Andreas Paul, Untergruppenbach (DE); Matthias Palmer, Angelbachtal (DE); Andre Werner, Leingarten (DE)

(73) Assignee: KACO GmbH + Co. KG, Heilbronn (DE)

( * ) Notice: Subject to any disclaimer, the term of this patent is extended or adjusted under 35 U.S.C. 154(b) by 317 days.

(21) Appl. No.: 16/081,936

(22) PCT Filed: Mar. 2, 2017

(86) PCT No.: PCT/EP2017/000280
§ 371 (c)(1),
(2) Date: Sep. 3, 2018

(87) PCT Pub. No.: WO2017/148586
PCT Pub. Date: Sep. 8, 2017

(65) Prior Publication Data
US 2020/0295634 A1    Sep. 17, 2020

(30) Foreign Application Priority Data

Mar. 3, 2016  (DE) .................... 10 2016 002 641.3
Sep. 5, 2016  (DE) .................... 10 2016 010 926.2

(51) Int. Cl.
H02K 11/40    (2016.01)
H02K 7/00    (2006.01)

(52) U.S. Cl.
CPC ............. *H02K 11/40* (2016.01); *H02K 7/003* (2013.01)

(58) Field of Classification Search
CPC .............................. H02K 11/40; H02K 7/003
See application file for complete search history.

(56) References Cited

U.S. PATENT DOCUMENTS 4,801,270 A    1/1989   Scarlata
5,812,908 A    9/1998   Larocca et al.
(Continued)

FOREIGN PATENT DOCUMENTS

CN    201113622    9/2008
CN    201113686    9/2008
(Continued)

*Primary Examiner* — Dang D Le
(74) *Attorney, Agent, or Firm* — Gudrun E. Huckett

(57) ABSTRACT

The invention relates to a shaft-grounding ring which is used to remove induced voltages or electric charges from a first machine element (68), preferably from a shaft, into a second machine element (69) and has an annular housing (1), which consists of electrically conductive material and is conductively connected to the one machine element (68, 69) and has an electrically conductive connection to at least one discharging element (8). The discharging element consists of an electrically conductive material and has an electrically conductive connection to the other machine element. The discharging element (8) is a disk-shaped discharging body that extends at least over part of the circumference thereof.

24 Claims, 15 Drawing Sheets

(56) References Cited

U.S. PATENT DOCUMENTS

| | | | |
|---|---|---|---|
| 8,169,766 B2 * | 5/2012 | Oh | H02K 11/40 361/221 |
| 9,634,547 B1 * | 4/2017 | Orlowski | H02K 11/40 |
| 2008/0258576 A1 | 10/2008 | Oh et al. | |
| 2013/0005158 A1 | 1/2013 | Richardson et al. | |
| 2013/0106236 A1 | 5/2013 | Roman et al. | |
| 2014/0203514 A1 | 7/2014 | Colineau et al. | |
| 2016/0020681 A1 | 1/2016 | Henger et al. | |

FOREIGN PATENT DOCUMENTS

| | | |
|---|---|---|
| CN | 103650303 | 3/2014 |
| CN | 104040845 | 9/2014 |
| CN | 105281501 | 1/2016 |
| DE | 10 2013 223 673 | 6/2015 |
| EP | 1 872 463 | 11/2006 |
| GB | 2 229 047 | 9/1990 |
| JP | H05297782 | 11/1993 |
| JP | 2010525787 | 7/2010 |
| JP | 2011162928 | 8/2011 |
| JP | 2014142065 | 8/2014 |

* cited by examiner

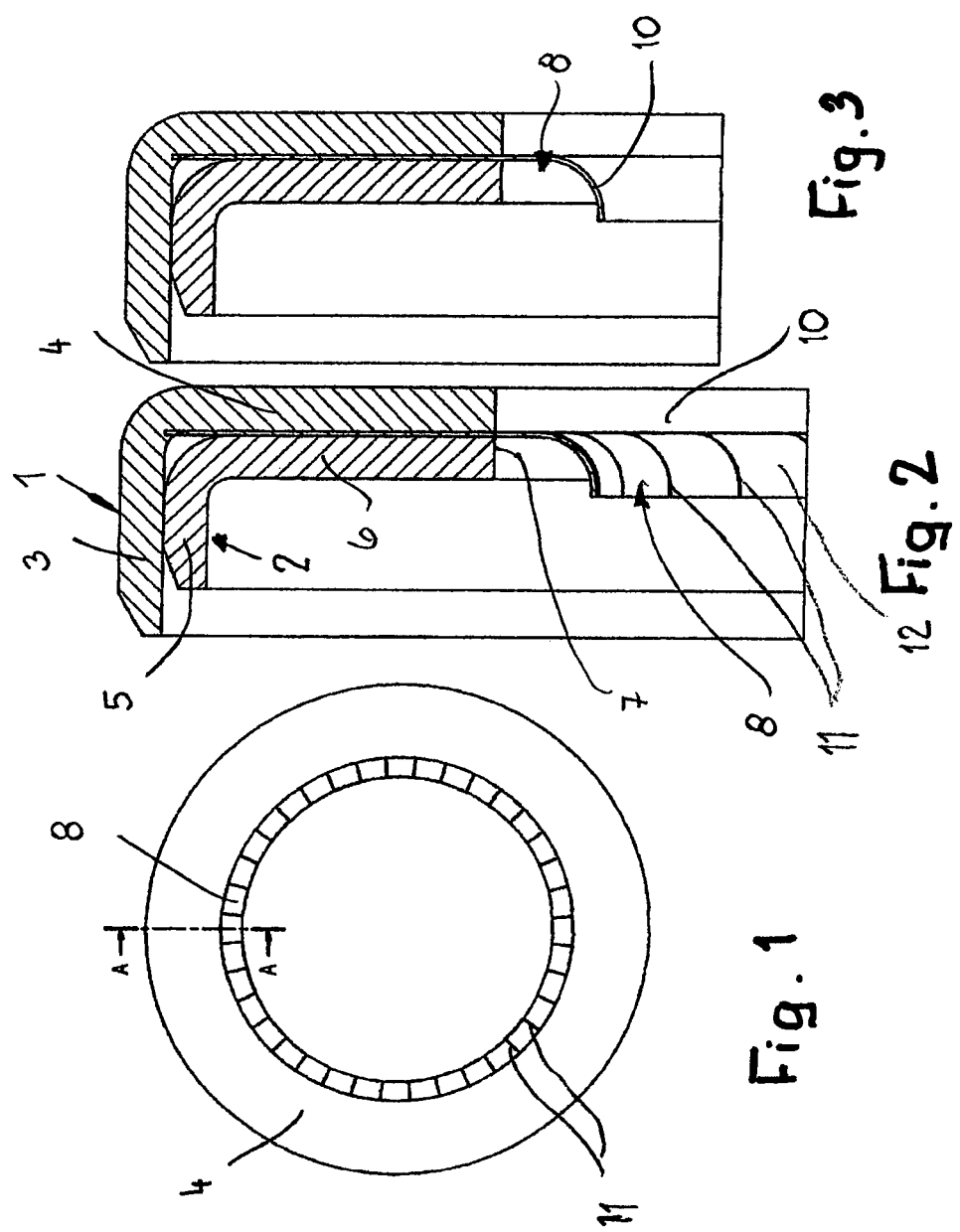

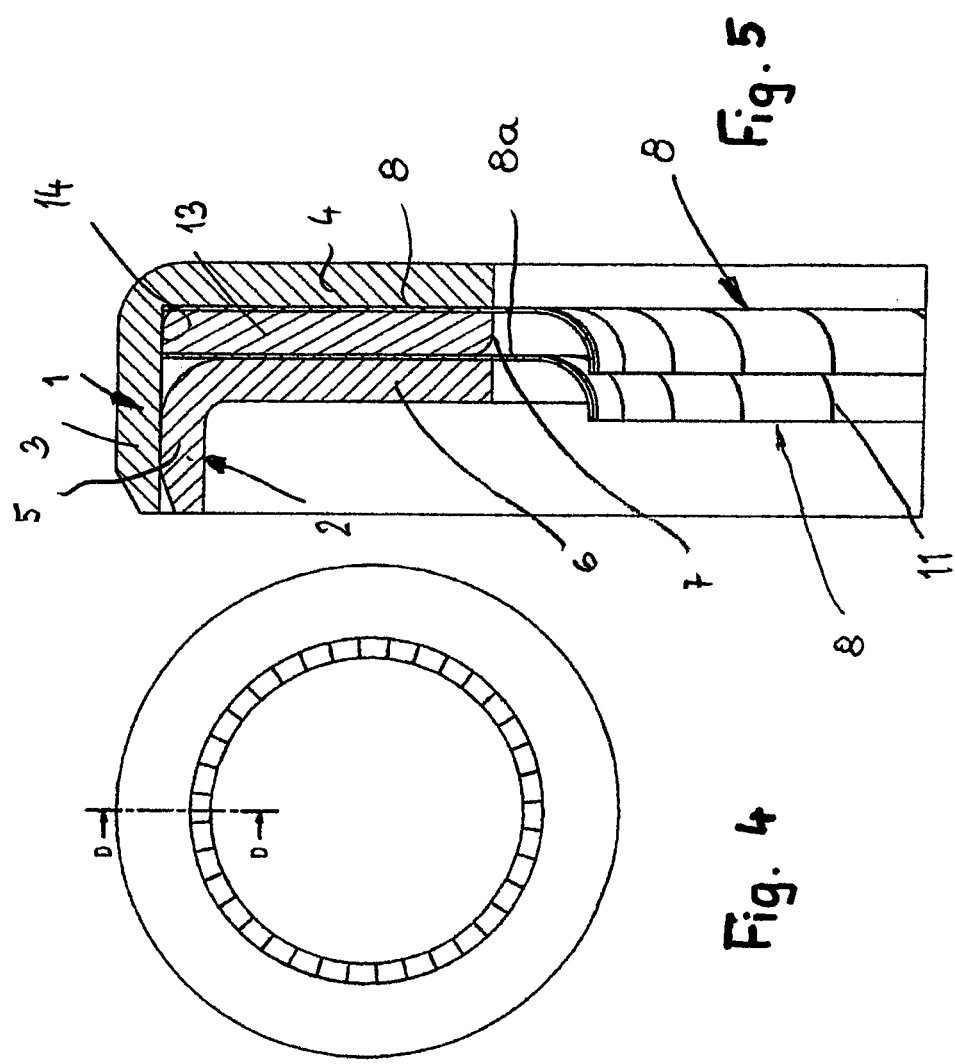

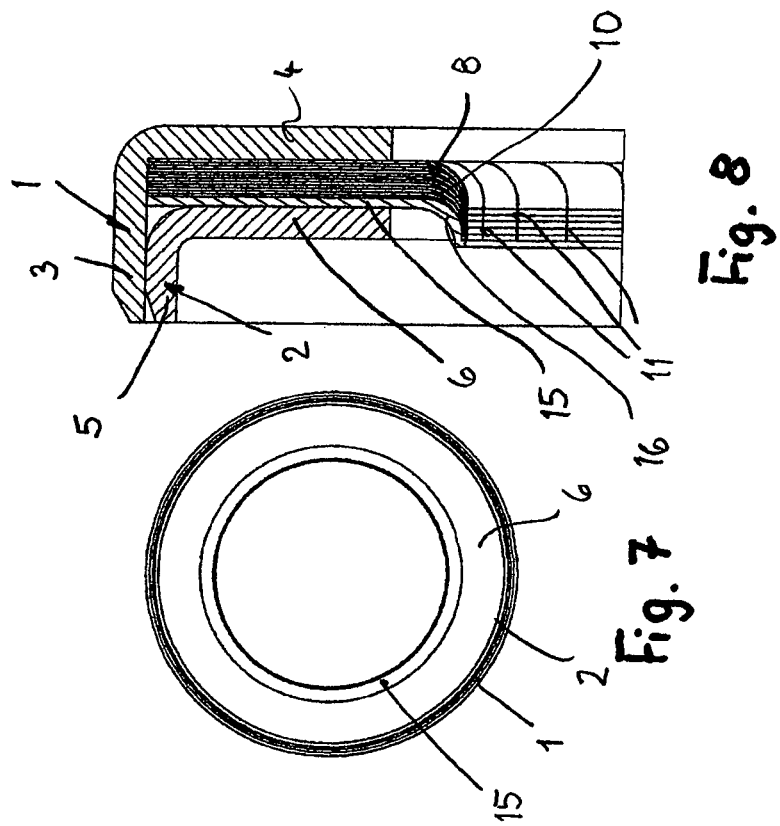
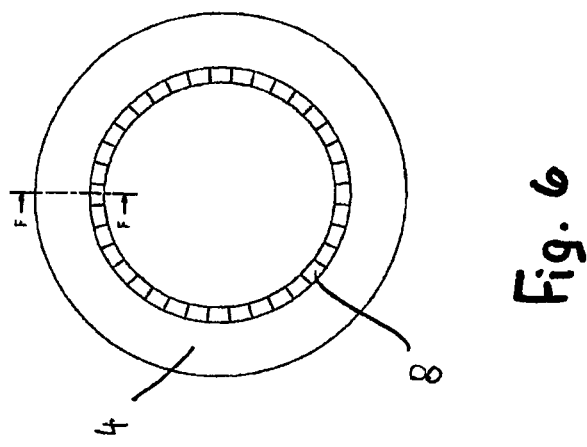

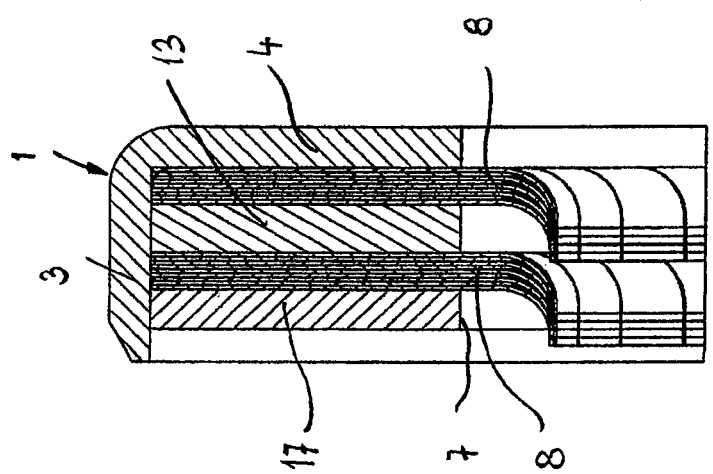
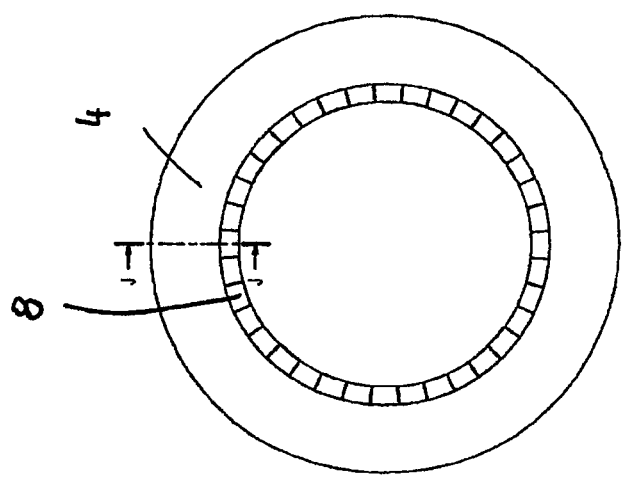

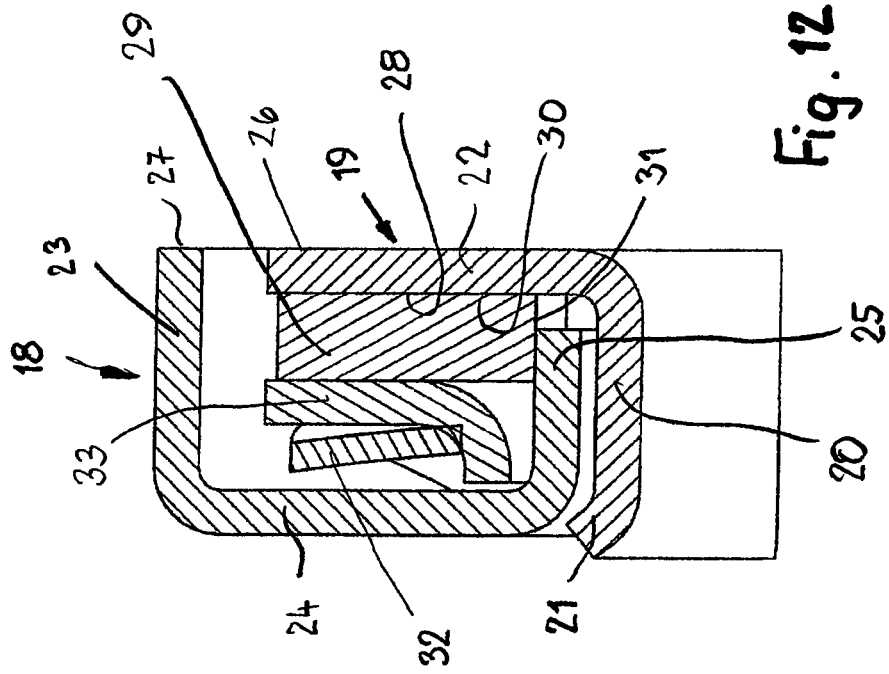
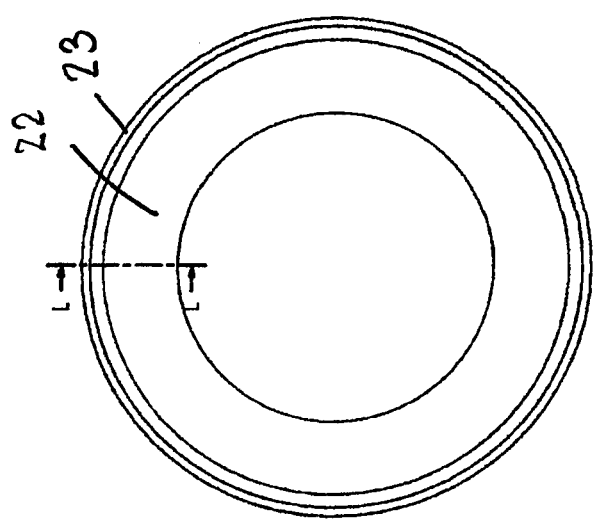

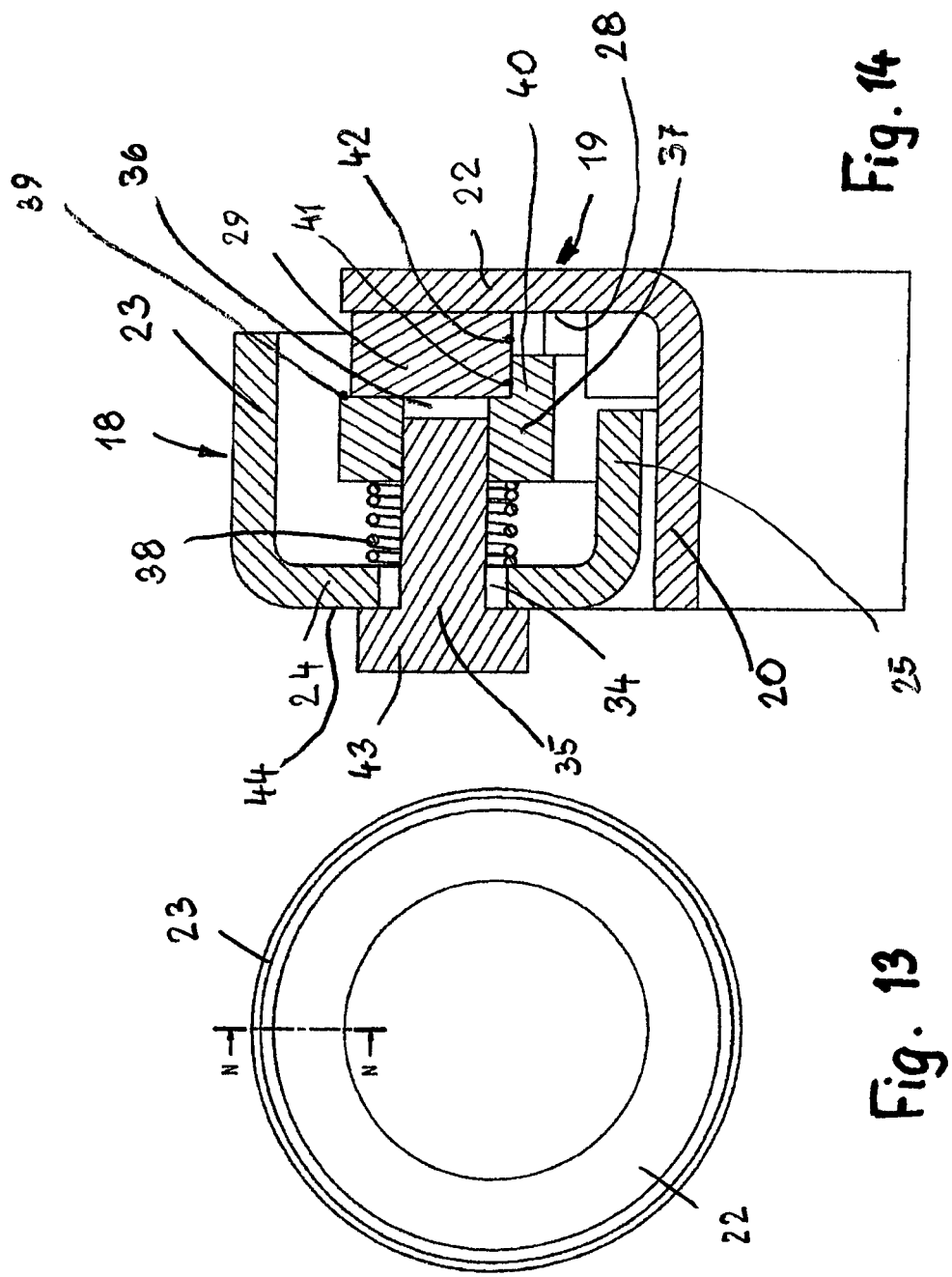

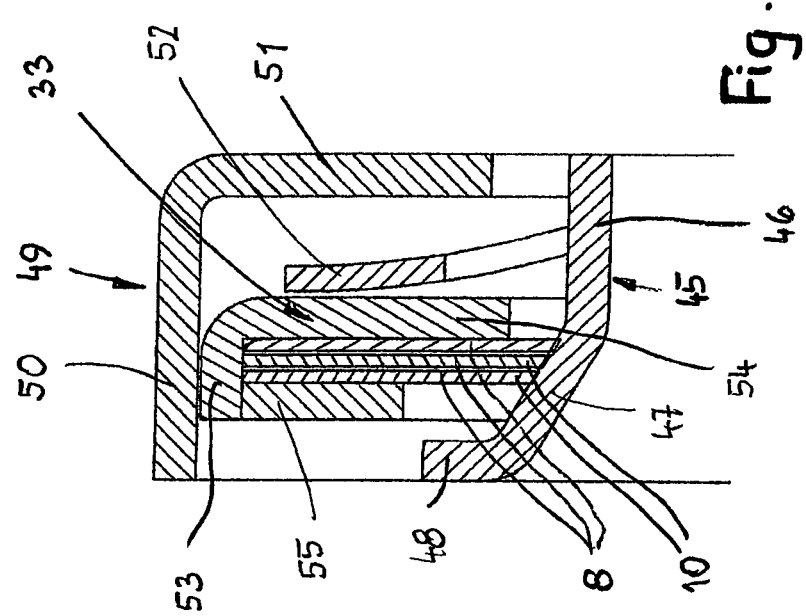
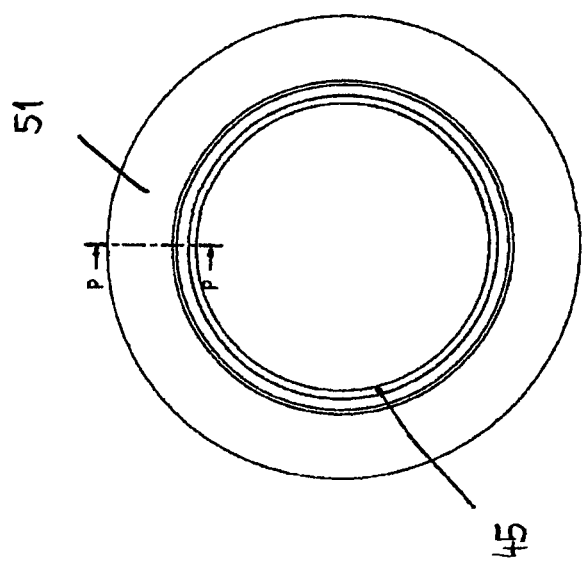

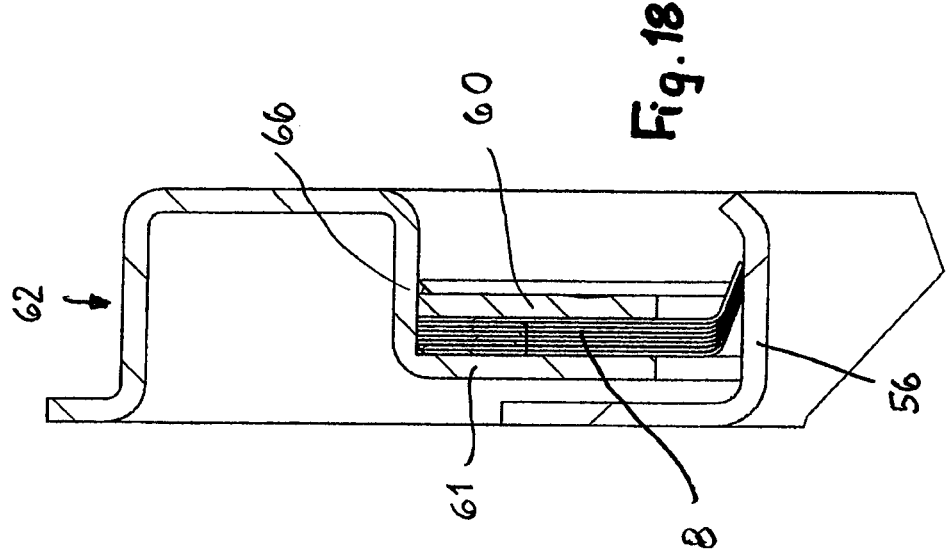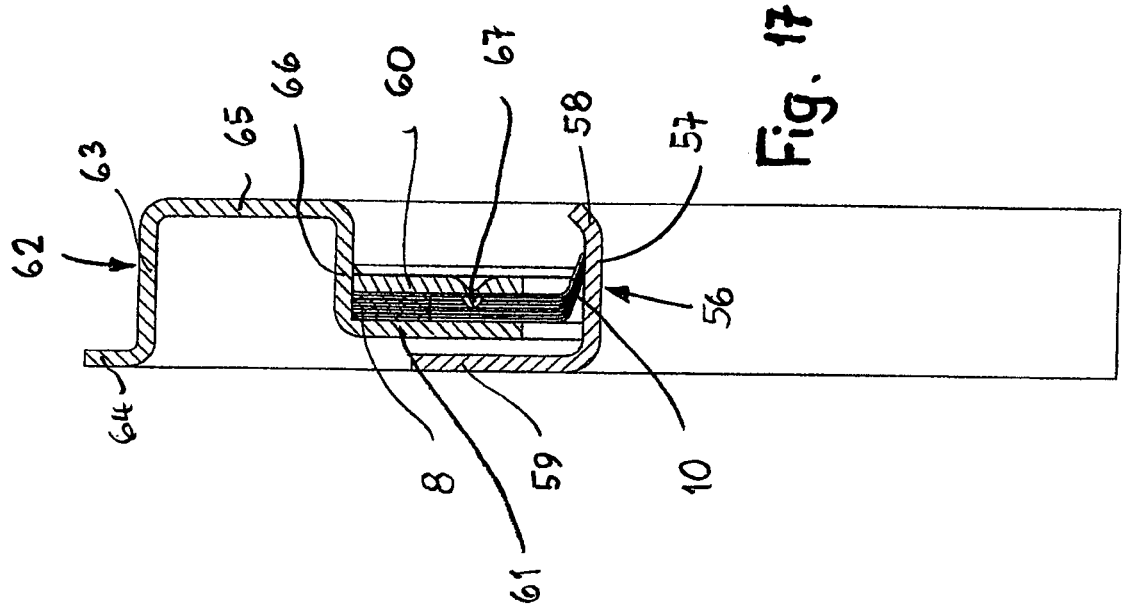

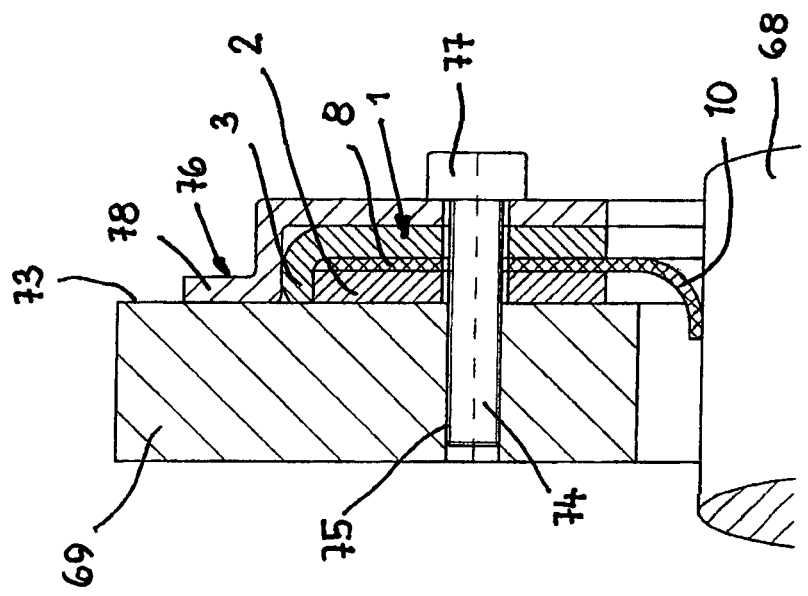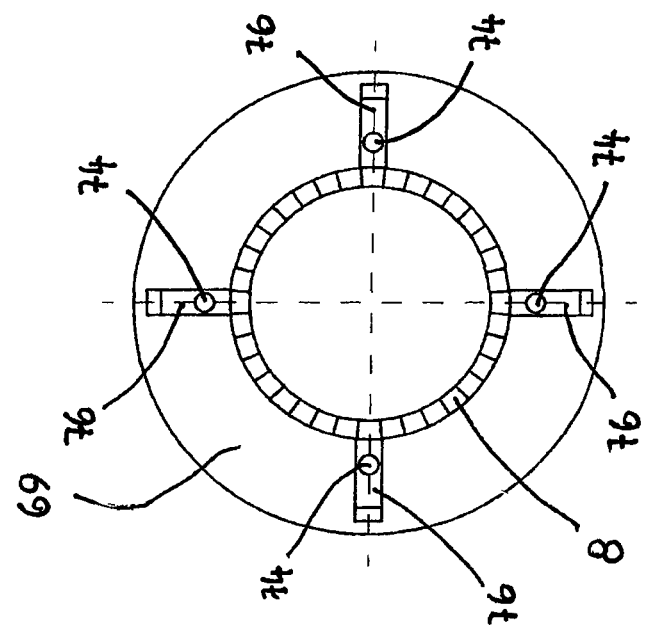

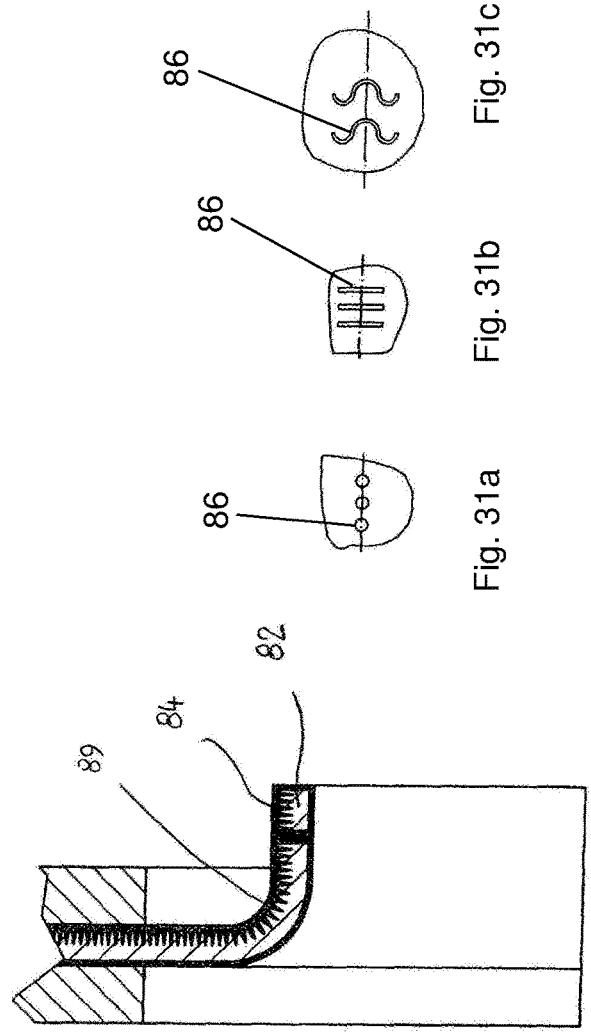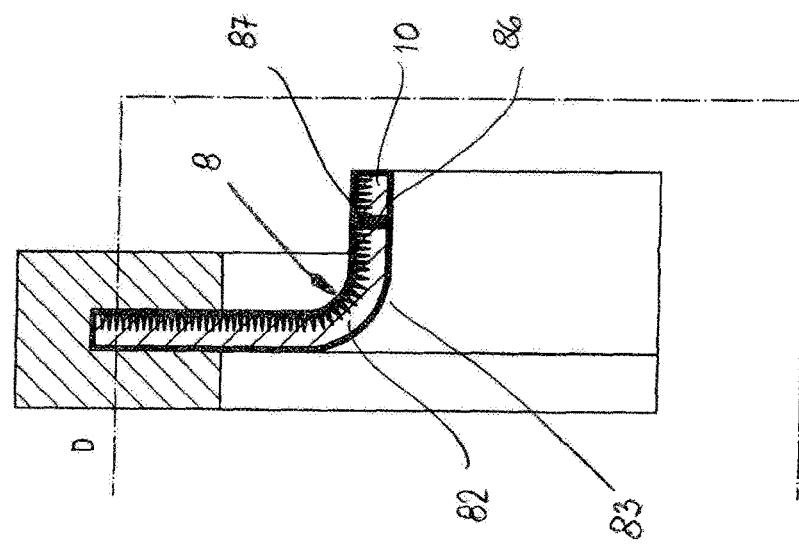

SHAFT-GROUNDING RING

BACKGROUND OF THE INVENTION

The invention concerns a shaft-grounding ring for dissipating induced voltages or electric charges away from a first machine element, preferably a shaft, into a second machine element, with an annular housing comprised of electrically conductive material that is conductively connected to one machine element and is electrically conductively connected with at least one dissipation element that also is comprised of an electrically conductive material and is electrically conductively connected with the other machine element.

For controlling electric drives, frequency converters are used increasingly. However, they induce in the drive shaft frequency-modified voltages. Inter alia, they can destroy the motor bearings or can cause problems with regard to EMC, for example, unpleasant interfering noise in the radio. At the running surfaces and the bearing balls of the motor bearings, the shaft currents cause small melted craters that lead to the bearing running surface becoming covered with depressions over time and the motor bearing failing in the end.

In order to dissipate the electric charges or voltages away from the motor shaft, shaft-grounding rings are known (EP 1 872 463 B1) which comprise filaments as dissipating elements that are fastened between two plates and project radially inwardly past these plates. The plates and the filaments are received in an annular housing that is connected electrically conductively with a grounded housing. The use of the conductive filaments requires a complex and correspondingly expensive manufacture of the shaft-grounding ring. In use, there is also the risk that the filaments become detached and lead to soiling and possibly to damages of the entire system to the point of total failure of the system. A problem is also a rotational direction change of the shaft because the filaments can follow the rotational direction reversal only with difficulty by corresponding adjustment.

The invention has the object to configure the shaft-grounding ring of the aforementioned kind such that it ensures a reliable dissipation of electric charges or electric voltages from the first to the second machine part while providing an inexpensive and simple manufacture.

SUMMARY OF THE INVENTION

This object is solved according to the invention for the shaft-grounding ring of the aforementioned kind in that the dissipation element is a disk-shaped dissipation body which extends at least over a portion of the circumference.

It is advantageous when the disk-shaped dissipation body as a dissipation element is an electrically conductive PTFE element which is positioned in a radial plane of the shaft-grounding ring, which is advantageously a PTFE disk. The electric conductivity is generated by corresponding electrically conductive fillers in the PTFE. Such a PTFE compound exhibits low friction and is wear-resistant. The PTFE element enables an advantageous surface contact with the rotating first machine element or the second machine element. By means of the PTFE element, a rotational direction change of the first machine element is possible without problem. The memory effect inherent in the PTFE element has the advantage that the PTFE element after its deformation attempts to return to its initial position, i.e., the disk shape. This has the advantage that the PTFE element can rest under elastic deformation of its radial inner region against the first machine element or of its radial outer rim region against the second machine element, depending on the installation position of the shaft-grounding ring. As a result of the memory effect, the PTFE element with corresponding restoring force is resting against the first or the second machine element. In this way, there is always a reliable connection with the respective machine element ensured so that the electric charge or the induced voltages on the first machine part can be dissipated reliably.

In this context, it can be advantageous that the elastically bent rim region of the dissipation element is provided about its circumference with cutouts, for example, slots open at the rim. They are provided in such a number and/or length that, on the one hand, the restoring force with which the rim region is resting against the first or the second machine element is sufficiently high so that sufficient conductive surface area of the electrically conductive material is resting against the machine element but, on the other hand, is so small that friction is only minimal.

For improving the dissipation, it can be advantageous when at least two, preferably more than two, dissipation elements are combined to a package. For example, a plurality of PTFE elements, preferably PTFE disks as preferred dissipation elements, can be placed next to each other.

In this case, it is advantageous when a spring element is resting against one side of the package of dissipation elements and has at least approximately the same shape and size as the dissipation element. The spring element ensures that the dissipation elements have proper contact with the first or the second machine element.

In order to ensure a simple and reliable attachment of the dissipation element, it can be advantageous when the dissipation element is clamped across more than half of its radial width between a clamping element and a base body which is comprised of electrically conductive material.

Advantageously, the base body is arranged within the housing and is fixedly and electrically conductive connected with it. In this way, the dissipation of the electric charge or voltages can be realized through the dissipation element and the base body to the housing.

In an advantageous further embodiment, it is provided that in the housing at least one further dissipation element or at least one additional package of dissipation elements is arranged, wherein the dissipation elements or packages of dissipation elements are separated from each other by at least one intermediate disk which is comprised of electrically conductive material. In this case, the shaft-grounding ring has two dissipation elements or packages of dissipation elements which are positioned with axial spacing relative to each other so that the dissipation of the harmful electric charges or voltages away from the first machine part can be improved.

It is furthermore advantageous when the clamping element is contacting the dissipation element under spring force. In this way, it is ensured that the clamping element is always tightly contacting the dissipation element and holds it safely.

In a preferred and constructively simple embodiment, the base body is embodied as one piece together with the housing.

It is however also possible that the base body is part of a bushing which is comprised of electrically conductive material and is fixedly connected with the first machine part. When this first machine part is advantageously a rotating shaft, the bushing is fixedly seated on the shaft.

Advantageously, the dissipation element is resting against the bushing and the housing. This enables a very simple configuration of the shaft-grounding ring as well as a reliable dissipation of the electric charges or voltages into the second machine element.

In a further advantageous embodiment, the dissipation element with its radially inner region is resting on a conical section of the bushing.

It is advantageous in this context when the dissipation element is force-loaded in the direction of the conical section of the bushing. For the force loading action, a pressure spring, such as a corrugated spring, can be used. This force loading action has the advantage that, in case of a possible wear of the dissipation element in the contact region relative to the bushing, the force loading action ensures that the dissipation element is displaced axially to such an extent that it contacts with its radially inner region the conical section of the bushing.

In an advantageous embodiment, the clamping element with which the dissipation element is clamped is provided with projections with which the clamping element is forced against the dissipation element. In this way, it can be prevented that the dissipation element is entrained rotatingly by the first rotating machine element.

In this context, it is advantageous when the clamping element is a clamping plate that is fastened to the housing, preferably by laser welding, wherein the projections can be formed by a stamping process. This contributes to a simple and inexpensive manufacture.

As material for the dissipation elements, electrically conductive PTFE is mentioned only one of the possible compact materials. A limitation to this material is however not intended by this. All materials with which the voltages or currents and electric charges can be dissipated are conceivable for the dissipation elements. Examples are suitable thermally resistant plastic materials, also additionally chemically resistant depending on the application, such as fluoro-thermoplastics or polyamides, with electrically conductive fillers, such as graphite, copper particles and the like. Further examples are electrically conductive elastomers, for example, fluororubber with corresponding electrically conductive fillers.

Moreover, it is possible to provide the dissipation elements with an electrically conductive coating. The coating can be applied onto the dissipation element. It can however also be a foil. The coating can also serve to reduce friction.

It is even possible to produce the dissipation element of a non-conductive material and to provide this material with an electrically conductive coating. In this context, the dissipation element in an advantageous manner comprises an elastically deformable disk-shaped base body which can be comprised of non-conductive, of hardly conductive or of conductive material. The base body is provided with the coating of electrically conductive material. For the base body of the dissipation element, advantageously polyfluorocarbon, in particular polytetrafluoroethylene, is employed.

A silver lacquer has been found to be an advantageous electrically conductive material for the coating. It can be applied simply onto the base body and has a very low resistivity.

It is advantageous when the coating envelopes the entire base body of the dissipation element.

In a particularly preferred embodiment, the base body of the dissipation element is provided with penetrations in the region in which the dissipation element is resting against the machine element. They are at least partially filled with electrically conductive material. Since the penetrations penetrate the base body of the dissipation element, it is ensured that even in case of a corresponding wear of the base body at its contact side at the machine element, a reliable dissipation of the induced voltages is still ensured. The electrically conductive material in the penetrations ensures in this situation that, independent of the degree of wear of the base body, the voltages can be discharged.

The electrically conductive material in the penetrations is advantageously at least connected with the coating that is provided on the side of the base body which is facing away from the machine element. In this case, the side of the base body which is facing the machine element must not be mandatorily provided with a coating. Due to the electrically conductive material which is located in the penetrations and has contact with the corresponding machine element, it is achieved that this material in the penetrations dissipates the induced voltages into the coating which is present at the side of the base body facing away from the machine part.

In an advantageous embodiment, the penetrations are also provided with electrically conductive material when the side of the base body which is coming into contact with the machine element is provided with the corresponding coating of electrically conductive material.

In order to ensure a proper dissipation of the voltages, the penetrations are distributed about the circumference of the base body. This distribution is provided such that the induced voltages of the machine element can be reliably dissipated.

It is particularly advantageous when the coating is an electrically conductive foil. It is a cost-efficient component. The electrically conductive foil can be, for example, a copper foil. Such foils have only minimal thicknesses, for example, of approximately only 0.03 mm.

The electrically conductive foil can be connected fixedly with the base member wherein as a connecting means any suitable means is conceivable, for example, a suitable adhesive. The foil can also be loosely contacting the base body and can be connected fixedly with the base body by application of a clamping force.

Advantageously, the coating (foil) extends from one side of the base body across its outer rim to the other side of the base body. In this context, one side of the respective base body can be covered completely by the foil while the foil at the other side of the base body only extends across a portion of the surface area of this base body side. With this smaller region, the foil can be resting against an electrically conductive holding ring or the like by means of which the induced voltages are dissipated away from the rotating machine part.

In a further advantageous embodiment, the coating (foil) is positioned between neighboring base bodies.

The subject matter of the application results not only from the subject matter of the individual claims but also from all specifications and features disclosed in the drawings and the description. Even if they are not subject matter of the claims, they are claimed as being important to the invention inasmuch as individually or in combination they are novel relative to the prior art.

Further features of the invention result from the additional claims, the specification, and the drawings.

BRIEF DESCRIPTION OF THE DRAWINGS

The invention will now be explained in more detail with the aid of a few embodiments illustrated in the drawings. It is shown in:

FIG. 1 in an end view a first embodiment of a shaft-grounding ring according to the invention, FIG. 2 in enlarged illustration a section along the line A-A in FIG. 1, FIG. 3 in an illustration corresponding to FIG. 2 a further embodiment of a shaft-grounding ring according to the invention, FIG. 4 in an end view a further embodiment of a shaft-grounding ring according to the invention, FIG. 5 in an enlarged illustration a section along the line D-D, FIG. 6 an end view a further embodiment of a shaft-grounding ring according to the invention, FIG. 7 a rear view of the shaft-grounding ring according to FIG. 6, FIG. 8 in enlarged illustration a section along the line F-F in FIG. 6, FIG. 9 in an end view a further embodiment of a shaft-grounding ring according to the invention, FIG. 10 in enlarged illustration a section along the line J-J of FIG. 9, FIG. 11 in an end view a further embodiment of a shaft-grounding ring according to the invention, FIG. 12 in enlarged illustration a section along the line L-L of FIG. 11, FIG. 13 in an end view a further embodiment of a shaft-grounding ring according to the invention, FIG. 14 in enlarged illustration a section along the line N-N of FIG. 13, FIG. 15 in an end view a further embodiment of a shaft-grounding ring according to the invention, FIG. 16 in enlarged illustration a section along the line P-P of FIG. 15, FIG. 17 in an axial section one half of a further embodiment of a shaft-grounding ring according to the invention, FIG. 18 in an illustration corresponding to FIG. 17 a further embodiment of a shaft-grounding ring according to the invention, FIG. 19 in an axial section one half of a further embodiment of a shaft-grounding ring according to the invention, FIG. 20 in an end view a further embodiment of a shaft-grounding ring according to the invention, FIG. 21 in enlarged illustration a section along the line Q-Q of FIG. 20, FIG. 22 the shaft-grounding ring according to FIG. 3 in installed position in axial section, FIG. 23 in an end view a further embodiment of a shaft-grounding ring according to the invention, FIG. 24 the installation position of the shaft-grounding ring according to FIG. 23 in axial section, FIG. 25 in axial section one half of a further embodiment of a shaft-grounding ring according to the invention, FIG. 26 the shaft-grounding ring according to FIG. 25 in a partial detail view;

DESCRIPTION OF PREFERRED EMBODIMENTS

Figure 21:
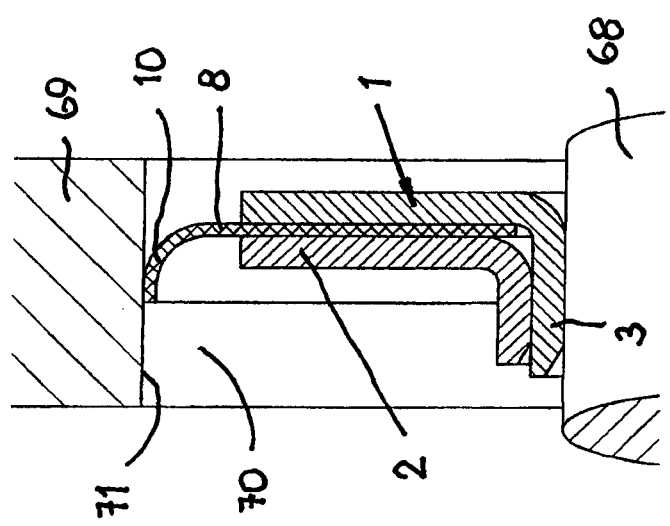

It is known that converter-operated alternating current motors induce harmful voltages at the motor shaft 68 (FIG. 21). When the voltage surpasses the resistance of the lubricant in a shaft bearing, these voltages discharge through the shaft bearing which is greatly stressed thereby and will be damaged upon extended use. With the shaft-grounding rings, the induced harmful voltages in the motor shaft 68 are reliably dissipated so that the voltages no longer are dissipated through the shaft bearings.

The shaft-grounding rings however can be used not only in motors but also, for example, in transmissions. In general, the shaft-grounding rings are used where induced voltages, currants or electric charges are to be dissipated away from shafts.

The shaft-grounding ring according to FIGS. 1 and 2 has an outer clamping ring 1 which is comprised of electrically conductive material and forms a housing and which has an L-shaped cross section in axial section. The clamping ring 1 surrounds an inner clamping ring 2 which is also comprised of electrically conductive material and has an L-shaped cross section in axial section. The outer clamping ring 1 has a cylindrical jacket 3 which passes into a radial flange 4 extending perpendicularly thereto. The inner clamping ring 2 has also a cylindrical jacket 5 which passes into a radial flange 6. The two radial flanges 4, 6 comprise centrally a through opening 7 for the shaft 68.

Figure 22:
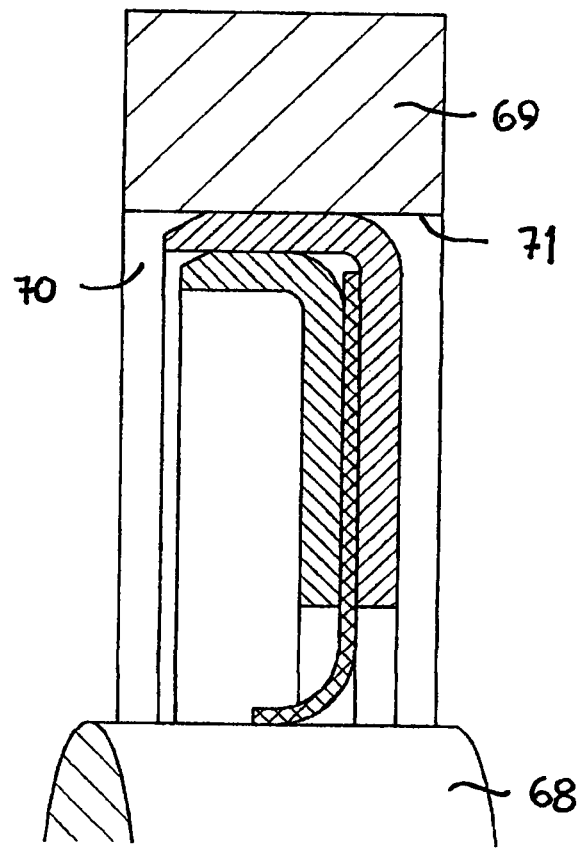

With the two clamping rings 1, 2 which are comprised advantageously of metal, a dissipation element in the form of a disk-shaped dissipation body 8 is clamped. It is comprised of electrically conductive material, preferably of a conductive PTFE. In principle, the dissipation body 8 can be comprised of any suitable electrically conductive material with which, in a way to still be described, the induced voltages can be dissipated away from the shaft 68 into the grounded housing 69 (FIG. 22). The preferred use of conductive PTFE has the advantage that this compact material is chemically and thermally resistant and exhibits only minimal friction. The inner clamping ring 2 is resting with its jacket 5 with press fit against the inner side of the jacket 3 of the clamping ring 1. In this way, the dissipation body 8 is reliably clamped between the two radial flanges 4, 6 of the two clamping rings 1, 2.

In order for the dissipation body 8 not to be damaged during clamping, the inner clamping ring 2 is rounded at the transition from the jacket 5 into the radial flange 6 on the outer side so that this transition has a spacing relative to the dissipation body 8.

The dissipation body 8 can be additionally connected with the radial flange 4 and/or the radial flange 6 in the region between the two radial flanges 4, 6 by an adhesive that is advantageously electrically conductive.

The radially inner region 10 of the dissipation body 8 projects past the rim of the through opening 7. This projecting portion is so large that this radially inner region 10 of the dissipation body 8 is resting with elastic deformation against the shaft 68.

Due to the elastic deformation of the dissipation body 8 it is achieved that it is resting areally against the shaft 68 and can thus reliably dissipate the voltages on the shaft 68.

In order for the force, induced by the elastic deformation and acting radially on the shaft 68, not to be too high, cutouts 11 that are distributed about the circumference and are open toward the rim are provided in this elastically deformable region and are designed as slots extending up to the inner rim of the dissipation body 8 in the embodiment. The length of the slots 11 is selected such that the sections 12 of the dissipation body 8 formed between the slots, on the one hand, are contacting with sufficient radial force the shaft 68 in order to dissipate the voltages reliably and, on the other hand, are contacting only with such a force that the wear of the dissipation body 8 in the contact region with the shaft is as small as possible.

The shaft-grounding ring is inserted into an installation space 70 of the housing 69 with press fit such that the jacket 3 of the outer clamping ring 1 is contacting with compression the inner wall 71 of the installation space 70 of the housing 69 (FIG. 22). The housing 69 itself is grounded. In this way, the voltage can be dissipated from the shaft 68 through the dissipation body 8 and the outer clamping ring 1 to the grounded housing 69.

The clamping ring 1 must not be pressed mandatorily into an installation space but can be, for example, fastened by means of transversely projecting tabs to a grounded component. Also, it is possible to screw-connect the clamping ring 1 directly to a grounded component. Only in the embodiment, the motor housing is the grounded component. The dissipation can however also be realized through other components which are correspondingly grounded.

These explanations apply also to the additional embodiments still to be described.

FIG. 3 shows the possibility not to provide the dissipation body 8 in the radially inner region 10 with cutouts as is the case in the preceding embodiment. Even then a reliable dissipation of the voltage from the shaft to the grounded housing is still possible in a reliable way. In order to keep the radial force resulting from the elastic deformation of the inner region 10 as small as possible, the radial width of the projecting region 10 can be selected to be correspondingly large. In other respects, the embodiment of FIG. 3 corresponds to the embodiment according to FIGS. 1 and 2.

The use of conductive PTFE for the dissipation body 8 has the advantage that this material has a so-called memory effect. This has the result that the elastically deformed inner region 10 has the tendency to return into its initial position. In this way, a restoring force is provided which counteracts a possible wear of this inner region of the dissipation body 8 and ensures in this way a constant reliable contact with shaft 68 for the period of use.

The dissipation body 8 which is comprised of conductive PTFE enables also a rotational direction change of the shaft 68. This does not cause erecting of the radially inner region 10 of the dissipation body 8.

In the embodiment according to FIGS. 4 and 5, two dissipation bodies 8 are used which are arranged one behind the other with axial spacing. The outer clamping ring 1 surrounds a clamping disk 13 which may contact with its outer rim 14 the inner side of the jacket 3 of the clamping ring 1. Between the clamping disk 13 and the radial flange 4 of the clamping ring 1, the dissipation body 8 is clamped in the described way. The dissipation body 8 is of the same configuration as in the embodiment according to FIGS. 1 and 2.

A second dissipation body 8*a* which is advantageously of the same configuration as the dissipation body 8 is clamped with the inner clamping ring 2 in interaction with the clamping disk 13. The second dissipation body 8*a* is clamped between the radial flange 6 of the inner clamping ring 2 and the clamping disk 13. The clamping ring 2 is seated with its jacket 5 in the described way with clamping action in the outer clamping ring 1. The clamping disk 13, like the two clamping rings 1, 2, has the central through opening 7 for the shaft 68.

The clamping disk 13 as an intermediate disk must not be comprised mandatorily of conductive material. The two clamping rings 1, 2 are comprised of electrically conductive material, preferably of metal. Both dissipation bodies 8, 8*a* are comprised advantageously of the conductive PTFE and are of the same configuration.

As in the preceding embodiments, the dissipation bodies 8, 8*a* are clamped across a relatively large radial width between the clamping rings 1, 2 and the clamping disk 13. Since the clamped region advantageously should be relatively large (in the embodiment greater than half the width), it is reliably ensured that the clamping disk 13 is not rotatably entrained. Also, a reliable dissipation of the voltage from the shaft to the grounded housing is realized in this way.

In this embodiment, the two dissipation bodies 8, 8*a* can also be designed differently. One dissipation body 8 can thus be embodied with the cutouts 11 and the other dissipation body 8*a* without the cutouts.

In the shaft-grounding ring according to FIGS. 6 to 8, a package of a plurality of dissipation bodies 8 is used that are positioned next to each other. They are of the same configuration and are comprised advantageously of electrically conductive PTFE. Preferably, the dissipation bodies are provided with the slots as cutouts 11. The dissipation bodies 8 positioned next to each other are clamped in the described way between the two clamping rings 1 and 2.

Between the radial flange 6 of the inner clamping ring 2 and the dissipation package there is a restoring disk 15 which ensures that the elastically bent inner regions 10 of the dissipation bodies 8 are forced reliably against the shaft 68 that is to be grounded. The restoring disk 15 can be designed as a spring element which in a reliable way ensures that the elastically bend regions 10 of the dissipation bodies 8 have proper contact with the shaft 68 to be grounded. The restoring disk 15 can be metallic as well as comprised of plastics or elastomers. As shown in FIG. 8, the restoring disk 15 has a similar shape and size as the dissipation bodies 8.

As illustrated in FIG. 8, the restoring disk 15 can be relatively thin in comparison to the radial flanges 4 and 6 of the two clamping rings 1, 2.

As in the preceding embodiment, the shaft-grounding ring can be mounted in a very simple way. The package of dissipation bodies 8 is inserted into the outer clamping ring 1, subsequently the restoring disk 15 is placed onto the package, and then the inner clamping ring 2 is pressed into the outer clamping ring 1 to such an extent that the dissipation bodies 8 together with the restoring disk 15 are safely held. The inner clamping ring 2 is seated in the described way with press fit in the outer clamping ring 1.

As in the preceding embodiments, the inner clamping ring 2 is designed such that its jacket 5 is not projecting axially past the jacket 3 of the outer clamping ring 1. The restoring disk 15 is advantageously designed such that, like the dissipation bodies 8, it is contacting with its outer rim the inner side of the jacket 3 of the outer clamping ring 1 and that its radial inner region 16 is elastically bent in the same way as the inner regions 10 of the dissipation bodies 8.

The embodiment according to FIGS. 9 and 10 differs from the preceding embodiment only in that the shaft-grounding ring comprises two packages of dissipation bodies 8 positioned next to each other. One dissipation package is clamped between the radial flange 4 of the outer clamping ring 1 and the clamping disk 13 and the second package of dissipation bodies 8 between the clamping disk 13 and a further clamping disk 17. It forms the inner clamping ring which is seated with press fit in the outer clamping ring 1. The clamping disk 17 also has the central through opening 7 for the shaft 68. The two packages of dissipation bodies 8 are of the same configuration as in the preceding embodiment. The clamping disk 17 is provided such that it presses the two packages of dissipation bodies 8 with intermediate positioning of the clamping disk 13 fixedly against the radial flange 4 of the outer clamping ring 1. The dissipation bodies 8 in the illustrated embodiment are of the same configuration as the dissipation bodies 8 according to FIGS. 1 and 2. There is however also the possibility to configure the dissipation bodies 8 within the package without cutouts. The packages are resting with their radially outer rim against the inner wall of the jacket 3 of the outer clamping ring 1.

The clamping disk 17, like the clamping disk 13 and the outer clamping ring 1, is comprised of electrically conductive material, preferably of metal.

While in the embodiment according to FIGS. 6 to 8, the restoring disk 15 is provided for the dissipation body package 8, such a restoring disk is not provided in the embodiment according to FIGS. 9 and 10. However, it can of course be provided also in this embodiment at one, however advantageously also at both dissipation body packages 8.

In the embodiment according to FIGS. 1 through 10, the dissipation bodies 8, 8a are resting directly on the shaft 68. There is however also the possibility to fasten a bushing fixedly on the shaft 68 on which the dissipation bodies 8, 8a are resting. In this case, the bushing is comprised of electrically conductive material, for example, of metal. Such bushings are provided in the embodiments described in the following.

In the embodiment according to FIGS. 11 and 12, the shaft-grounding ring has an annular housing 18 that in axial section is U-shaped and surrounds at a spacing the shaft 68. An annular support part 19 that in axial section is L-shaped is fixedly seated on the shaft 68. It has a cylindrical bushing 20 which is seated fixedly on the wall of the shaft 68. Its free end 21 advantageously widens in a funnel shape so that the support part 19 can be pressed easily onto the shaft 68. A radially outwardly projecting annular flange 22 adjoins the bushing 20.

The housing 18 has a radially outwardly positioned cylindrical jacket 23 which at one end passes into a radially inwardly oriented annular flange 24. It extends approximately at the level of the free end 21 of the bushing 20 of the support part 19. The annular flange 24 passes radially inwardly into a cylindrical jacket 25 that surrounds at a radial spacing the bushing 20 and has axial spacing relative to the annular flange 22 of the support part 19.

The radially outwardly extending annular flange 22 of the support part 19 is positioned within the housing 18. Advantageously, the outer side 26 of the annular flange 22 is positioned together with the end face 27 of the jacket 23 of the housing 18 in a common radial plane of the shaft-grounding ring. The annular flange 22 has radial spacing from the jacket 23 of the housing 18 so that the support part 19 can rotate without problem together with shaft 68.

The shaft-grounding ring is pressed with the jacket 23 of the housing 18 into the installation space 70 of the housing 69. Upon rotation of the shaft, the housing 18 is thus stationary. The housing 18 as well as the support part 19 are comprised of electrically conductive material, in particular of metal.

A dissipation ring 29 is resting against the inner side 28 of the annular flange 22 and is comprised of electrically conductive material, preferably of conductive PTFE. The dissipation ring 29 surrounds the shaft 68 and has rectangular cross section. The dissipation ring 29 is positioned with its one planar outer side 30 areally against the inner side 28 of the annular flange 22. Also, the dissipation ring 29 is resting with its radially inner annular surface 31 areally against the outer side of the jacket 25 of the housing 18.

The dissipation ring 29 is pressed by at least one spring element 32, which is a corrugated spring in the embodiment, axially fixedly against the annular flange 22 of the support part 19. Advantageously, the spring element 32 presses the dissipation ring 29 with interposition of an intermediate disk 33 against the annular flange 22. The intermediate disk 33 is resting areally against the dissipation ring 29 across most of its radial width so that it is pressed tightly against the annular flange 22 of the support part 19. The spring element 32 is supported with one end at the annular flange 24 of the housing 18 and exerts such a high spring force that the dissipation ring 29 is pressed sufficiently tightly against the annular flange 22 of the support part 19.

The dissipation ring 29 is comprised advantageously of a material with minimal friction. Since the support part 19 is connected fixedly with the shaft 68, the annular flange 22 of the support part 19 rotates relative to the dissipation ring 29. A friction-reduced material is therefore advantageous with regard to wear.

In the described embodiment, an axial arrangement exists while in the embodiments according to FIGS. 1 through 10 a radial arrangement of the dissipation bodies 8, 8a exists. The voltages or electric charges are dissipated away from the shaft 68 through the support part 19, the dissipation ring 29, and the jacket 25 of the housing 18 to the grounded housing 69 through the jacket 23. The dissipation ring 29 is positioned in a protected way between the housing 18 and the annular flange 22 of the support part 19. The dissipation ring 29 as well as the intermediate disk 33 have sufficient spacing from the jacket 23 of the housing 18 at whose annular flange 24 the spring element 32 is axially supported. Upon mounting of the shaft-grounding ring, the housing 18 as well as the support part 19 are pressed into the receiving space 70 of the housing 69 and onto the shaft 68 in such a way that the reliable contact between the dissipation ring 29 and the housing 18 as well as the support part 19 is ensured. The spring element 32 can moreover axially readjust the dissipation ring 29 in case of wear so that the reliable contact between it and the annular flange 22 is ensured.

The annular flanges 22 and/or 24 of the support part 19 and of the housing 18, in deviation from the illustrated embodiment, can also be extending radially at a slant outwardly or inwardly. In this case, the dissipation ring 29 is adapted correspondingly in such a way that it is resting areally against the radial flange 22 of the support part 19.

The shaft-grounding ring according to FIGS. 13 and 14 is also an axial arrangement relative to the dissipation ring 29. The shaft-grounding ring comprises the support part 19 which is seated with the bushing 20 fixedly on the shaft 68. The housing 18 is of the same configuration as in the preceding embodiment and comprises in its annular flange 24 openings 34 that are distributed about the circumference and through which a pin 35 is projecting, respectively. It engages axial bores 36 which are provided in a pressure disk 37 which surrounds at a radial spacing the inner jacket 25 of the housing 18. The pressure disk 37, like the dissipation ring 29, has also a radial spacing relative to the outer jacket 23 of the housing 18.

The pressure disk 37 is spring-loaded in the direction toward the dissipation ring 29. Each pin 35 is surrounded by a pressure spring 38 which is supported with one end at the inner side of the annular flange 24 of the housing 18 and with the other end at the pressure disk 37.

The pressure disk 37 is designed such that the dissipation ring 29 has contact therewith axially as well as radially. As shown in FIG. 14, the dissipation ring 29 with its back side which is facing away from the annular flange 22 of the support part 19 is resting areally against the side face 39 of the pressure disk 37.

A central annular projection 40 projects axially past the side face 39 and the dissipation ring 29 is resting with its radially inner annular surface 42 against its cylindrical outer jacket surface 41.

By means of the pressure springs 38, the dissipation ring 29 is fixedly pressed against the radially outwardly projecting annular flange 22 of the support part 19. Since the pressure springs 38 are distributed about the circumference of the pressure disk 37, the pressure disk 37 is uniformly contacting with its side face 39 the back side of the dissipation ring 29 so that the latter is fixedly pressed against the inner side 28 of the annular flange 22. The pins 35 serve as axial guides for the pressure disk 37 and are fastened with a head 43 at the outer side 44 of the annular flange 24 of the housing 18 that is positioned in a radial plane. In this way, the voltages or electric charges can be dissipated from the shaft 68 through the support part 19 fixedly seated thereon, the dissipation ring 29, the pressure disk 37, the pins 35, the pressure springs 38, and the housing 18 into the grounded housing 69. The corresponding components for the dissipation of the voltages or electric charges are comprised correspondingly of electrically conductive material, preferably of metal. The pressure springs 38 serve also as readjusting elements for the dissipation ring 29 in case that it should wear at its contact surface relative to the annular flange 22 of the support part 19.

The shaft-grounding ring according to FIGS. 15 and 16 has a bushing 45 that is seated with a cylindrical section 46 fixedly on the shaft 68. A conical section 47 adjoins the cylindrical section 46 and widens away from the cylindrical section 46 conically in outward direction and passes at the free end into a radially extending annular flange 48. The bushing 45 is comprised of electrically conductive material, preferably of metal.

A housing 49, which in axial section is L-shaped and is pressed with a cylindrical jacket 50 into the installation space 70 of the housing 69, serves for installation of the shaft-grounding ring. The free end of the jacket 50 is positioned at the level of the annular flange 48 of the bushing 45.

The jacket 50 passes into a radially inwardly oriented annular flange 51 which is positioned at the level of the free end of the cylindrical section 46 of the bushing 45. The annular flange 51 has a substantially greater radial width than the annular flange 48 of the bushing 45. Viewed in axial direction, the two annular flanges 48, 51 overlap each other. The annular flange 51 surrounds at radial spacing the cylindrical section 46 of the bushing 45.

The dissipation bodies 8 with their radial inner rim are resting against the conical section 47 of the bushing 45. They are clamped between the intermediate disk 33 and a support disk 55 in such a way that they are contacting each other. Due to the conicity, the dissipation bodies 8 have different inner diameter.

The intermediate disk 33 has an L-shaped cross section in axial section. The intermediate disk 33 engages with a cylindrical jacket 53 across the package of dissipation bodies 8. The cylindrical jacket 53 passes into a radial inwardly oriented annular flange 54 which, at its exterior side facing away from the dissipation bodies 8, is engaged by at least one pressure spring 52 which is advantageously a corrugated spring and is axially supported at the annular flange 51 of the housing 49. The annular flange 54 surrounds at a spacing the transition area from the cylindrical section 46 to the conical section 47 of the bushing 45. The annular flange 54 extends across more than half of the radial width of the dissipation bodies 8 so that they can be reliably compressed by the annular flange 54.

The support disk 55 is positioned in a radial plane of the shaft-grounding ring and has an inner diameter that is greater than the outer diameter of the annular flange 48 of the bushing 45.

The cylindrical jacket 53 of the intermediate disk 33 has such an axial length that it encloses externally the support disk 55 as well as the package of dissipation bodies 8. The support disk 55 is fastened with its outer rim to the inner side of the jacket 53 of the intermediate disk 33. The cylindrical jacket 53 has a spacing relative to the inner side of the jacket 50 of the housing 49.

In use of the shaft-grounding ring, the voltages are dissipated away from the shaft 68 via the bushing 45 which is fixedly seated thereon, the dissipation bodies 8, and the pressure spring 52 to the housing 49 that, due to the press fit in the installation space 70 of the housing 69, dissipates the voltages into the grounded housing 69.

The pressure spring 52 ensures that the dissipation bodies 8 with their radial inner region 10 are always in sufficient contact with the conical section 47 of the bushing 45. The pressure spring 52 loads the unit of intermediate disk 33, dissipation bodies 8, and support disk 55 in axial direction. The dissipation bodies 8 center this unit within the housing 49.

The inner diameter of the dissipation bodies 8 can advantageously be selected such that it is slightly greater than the respective outer diameter of the conical section 47 of the bushing 45. In such a configuration of the dissipation bodies 8 a reliable contact between the dissipation bodies 8 and the bushing 45 as well as the intermediate disk 33 is ensured. In this way, the charges on the shaft 68 can be reliably dissipated into the grounded housing 69. Since the dissipation bodies 8 project past the annular flange 54 of the intermediate disk 33 in radial direction inwardly, it is possible that the projecting regions 10 of the dissipation bodies 8 are elastically deformed which improves contact between the dissipation bodies 8 and the conical section 47 of the bushing 45.

In the embodiment according to FIG. 17, the dissipation bodies 8, assembled to a package, are seated with their radially inner elastically deformed region 10 on a bushing 56 which is fixedly seated with a cylinder part 57 on the shaft. The free end 58 of the cylinder part 57 is advantageously conically widened which serves for simple mounting of the bushing 56 on the shaft. The cylinder part 57 passes into a radially outwardly extending annular flange 59. The bushing 56 is comprised of an electrically conductive material, preferably of metal.

The dissipation bodies 8 are clamped by means of an annular clamping disk 60 against a radial flange 61 of a housing 62. It is comprised also of electrically conductive material, in particular of metal, so that it can dissipate the voltages or electric charges away from the shaft 68 to the grounded housing 69.

The housing 62 has an outer cylindrical jacket 63 with which the housing is seated with press fit in the installation space 70 of the housing 69. The cylindrical jacket 63 is adjoined by a radially outwardly oriented annular flange 64 with which the housing 62 in the installation position is contacting an end face of the housing 69. The annular flange 64 facilitates the installation of the housing 62 in the installation space 70 of the housing 69. The jacket 63 passes at the other end into a radially inwardly oriented annular flange 65 which is positioned at the level of the conically widened end 58 of the bushing 56. A radially inner cylindrical jacket 66 adjoins the annular flange 65 and passes into a radially inwardly oriented radial flange 61. The two jackets 63, 66 of the housing 62 are positioned coaxially relative to each other as well as to the axis of the shaft-grounding ring. The radial flange 61 has axial spacing relative to the annular flange 59 of the bushing 56. Since the bushing 56 is fixedly connected to the shaft, this radial spacing ensures that the bushing 56 can be rotated without being impaired by the housing 62.

The package of dissipation bodies 8 is pressed by the clamping disk 60 against the annular radial flange 61. The clamping disk 60 can be embodied as a simple clamping plate that can be attached in a simple way to the cylindrical jacket 66, preferably by laser welding. The dissipation bodies 8 and the clamping disk 60 are resting with their outer rim against the exterior side of the jacket 66 which is facing the bushing 56. The dissipation bodies 8 are identically configured among each other and are comprised advantageously of electrically conductive PTFE.

In order for the package of dissipation bodies 8 not to be rotatingly entrained about its axis by the bushing 56 in use, the clamping disk 60 is provided about its circumference with axially projecting projection 67 which are distributed about the circumference of the clamping disk 60 and ensure that the dissipation bodies 8 are secured properly against rotation. When the clamping disk 60 is comprised of sheet metal, the projections 67 can be provided in a simple way by a corresponding stamping operation on the clamping plate.

The dissipation bodies 8 can be embodied in accordance with the embodiments of FIGS. 1 through 10.

In use, the voltages or electric charges are absorbed away from the shaft 68 through the bushing 56 by the dissipation bodies 8 which dissipate them through the housing 62 into the grounded housing 69.

The shaft-grounding ring according to FIG. 18 differs from the preceding embodiment only in that the clamping disk 60 has no axial projections which act on the package of dissipation bodies 8. The clamping disk 60 is fastened on the jacket 66 of the housing 62 in such a way that the dissipation bodies 8 are compressed between the radial flange 61 of the housing 62 and the clamping disk 60 so strongly in axial direction that the dissipation bodies 8 are not entrained by the bushing 56 upon rotation of the shaft.

Figure 19:
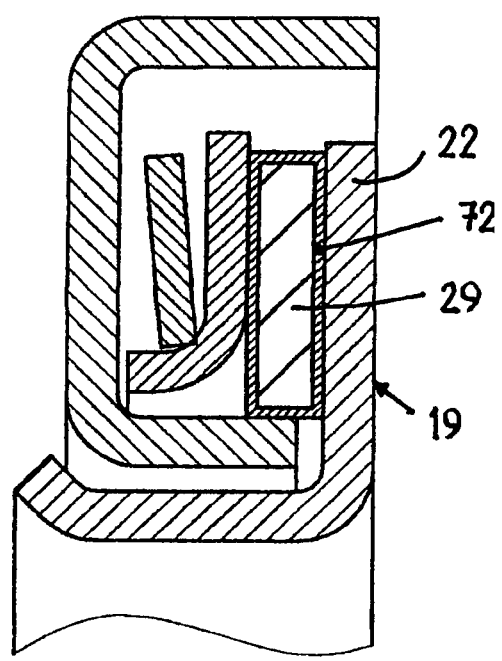

The embodiment according to FIG. 19 corresponds to the embodiment according to FIGS. 11 and 12. The only difference resides in that the dissipation ring 29 at least at its contact surfaces is provided with an electrically conductive coating 72 wherein the coatings 72 are connected conductively to each other. The coating has at least in the contact region with the annular flange 22 of the support part 19 such a thickness that the dissipation ring 29, even for an extended period of use of the shaft-grounding ring, can reliably dissipate the voltages or electric charges away from the shaft 68. Advantageously, the dissipation ring 29 is surrounded by the coating 72. The dissipation ring itself can then be comprised of electrically non-conductive material.

Figure 20:
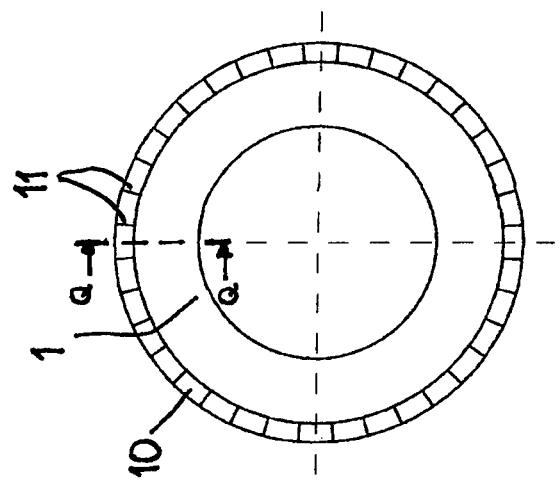

FIGS. 20 and 21 show a shaft-grounding ring that in principle is of the same configuration as the embodiments according to FIGS. 1 to 3. In contrast to these embodiments, the clamping ring 1 is fixedly seated with its cylindrical jacket 3 on the shaft 68. The disk-shaped dissipation body 8 is resting in this case with its region 10 radially projecting past the two clamping rings 1, 2 against the inner wall 71 of the installation space 70 of the housing 69. In such a configuration of the shaft-grounding ring, the voltages or electric charges can also be dissipated away from the shaft 68 via the clamping ring 1 and the dissipation body 8 to the housing 69.

The radially projecting region 10 of the dissipation body 8 in accordance with the embodiment of FIGS. 1 and 2 can be provided with cutouts 11 distributed about the circumference (FIG. 20) which advantageously are formed by slots.

However, the disk-shaped dissipation body 8 can also be embodied in accordance with the embodiment of FIG. 3, in which the radially projecting region 10 has no such cutouts.

The shaft-grounding rings according to FIGS. 4 to 10 can also be installed in the same manner as has been described with the aid of the embodiment according to FIGS. 20 and 21.

FIGS. 23 and 24 show an alternative installation situation compared to the installation position according to FIG. 22. In this case, the shaft-grounding ring is not pressed into the installation space 70 of the housing 69 but screwed to an end face 73 of the housing 69. The disk-shaped dissipation body 8 is resting with its radially inner region 10 with elastic deformation against the shaft 68. The dissipation body 8 is clamped between the clamping ring 1 and the clamping ring 2 which, in contrast to the embodiments according to FIGS. 1 to 3, has no external cylindrical jacket. The clamping ring 1 engages with its cylindrical jacket 3, radially in outward direction, across the dissipation body 8 as well as the clamping ring 2. The clamping force is generated by means of clamping screws 74 which are distributed about the circumference of the shaft-grounding ring. In the illustrated embodiment, the clamping screws 74 are positioned at an angular spacing of 90° relative to each other (FIG. 23). The clamping screws 74 penetrate with play the two clamping rings 1, 2 as well as the dissipation body 8 and are screwed into threaded bores 75 in the housing end face 73. In order to be able to transmit the clamping force optimally to the two clamping rings 1, 2 and the dissipation body 8 positioned therebetween, in the embodiment four radially extending clamping tabs 76 are provided which are also penetrated with play by the clamping screws 74 and at whose outer side the clamping screws 74 are resting with their head 77.

The clamping tabs 76 are narrow radially extending tabs whose radially outer region is bent such that the tabs with a bent rim region 78 are resting against the housing end face 73.

With the clamping screws 74, the clamping tabs 76 can be pressed with sufficiently high force against the clamping ring 1 so that the latter, by means of the dissipation body 8, presses the inner clamping ring 2 tightly against the housing end face 73.

This exemplary installation situation is expedient when the shaft-grounding ring cannot be mounted in an installation space of a housing or of a device but must be connected externally to the housing or to the device.

Figure 26:
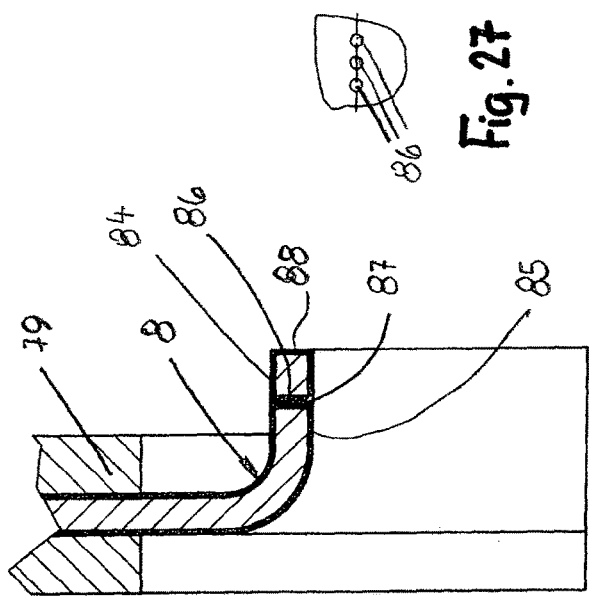
Figure 25:
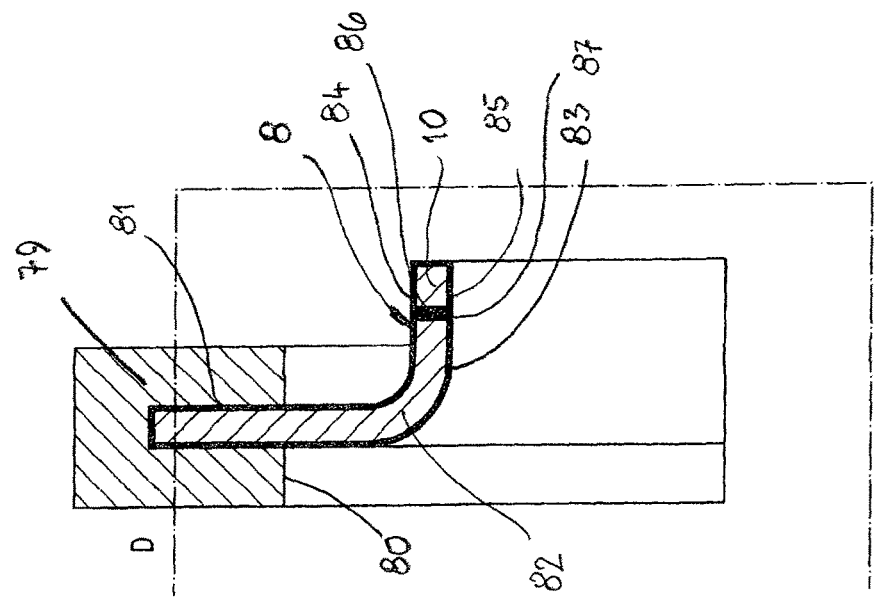

FIGS. 25 and 26 show a particularly advantageous embodiment of the dissipation body 8. It is embodied in accordance with the embodiments of FIGS. 1 to 10 in a disk shape and fastened in a holding ring 79 of electrically conductive material that is preferably comprised of metal. As shown in FIG. 25, the holding ring 79 in an exemplary fashion has a rectangular contour. At its radially inner cylindrical jacket surface 80, it is provided with an inner centrally positioned annular groove 81 in which the dissipation body 8 engages with its radially outer region and is fastened in a suitable way. The dissipation body 8 can be fastened also in analogy to FIGS. 1 through 10.

The dissipation body 8 has the disk-shaped base body 82 which is advantageously comprised of PTFE but can be comprised also of any other suitable elastic material. In the installation position, it is resting with its radially inner region 10 with elastic deformation on the shaft 68 (FIG. 22).

In order to dissipate the induced voltages in the motor shaft 68, the base body 82 of the dissipation body 8 is completely enclosed by a coating 83 of electrically conductive material. Such a material, for example, is a silver lacquer which can be applied to the base body 82 so as to be permanently fixed.

Due to the coating 83, the base body 82 itself must not be comprised of electrically conductive material. Advantageous is however when the base body 82 is produced also of electrically conductive material, preferably of a conductive PTFE. As in the embodiments according to FIGS. 1 to 10, the base body 82 can also be comprised of any other suitable electrically conductive material with which the induced voltages of the motor shaft 68 can be dissipated to the grounded housing 69 (FIG. 22).

In the installation position, the radial inner region 10 of the dissipation body 8 is resting in the described way with elastic deformation and thus with a radial force against the motor shaft 68 so that a reliable dissipation of the induced voltages away from the motor shaft 68 is ensured.

The specific resistance p of the coating 83 is multiple times smaller than the specific resistance p of the base body 82. By application of this electrically conductive coating 83, the conductivity is additionally improved and the resistance significantly reduced in this way.

A further resistance reduction results in an advantageous way when in the radial inner region 10 of the dissipation body 8 the side 84 of the coating 83 which is facing away from the motor shaft 68 is connected electrically conductively to the side 85 that is facing the shaft to be sealed. This is achieved in that the base body 82 in the radial inner region 10 is provided with penetrations 86 distributed about its circumference and filled at least partially with electrically conductive material 87. It is advantageously the same material of which the coating 83 is comprised. By means of the material 87 in the penetrations 86, the two sides 84 and 85 of the coating 83 are connected to each other.

Figure 29:
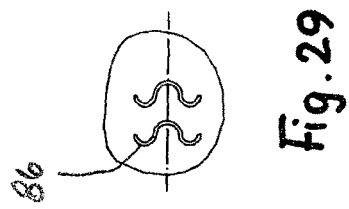
FIG. 27, FIG. 28, and FIG. 29 different embodiments of penetrations in the dissipation body of the shaft-grounding ring according to FIG. 25, FIG. 30 and FIG. 31 in illustrations corresponding to FIGS. 25 and 26 a further embodiment of a shaft-grounding ring according to the invention, FIGS. 31a, 31b, 31c different embodiments of penetrations in the dissipation body of the shaft-grounding ring of FIG. 31, FIG. 32 in axial section a further embodiment of a shaft-grounding ring according to the invention, FIG. 33 in enlarged illustration one half of the shaft-grounding ring according to FIG. 32, FIG. 34 in enlarged illustration a section along the line A-A in FIG. 32.
Figure 28:
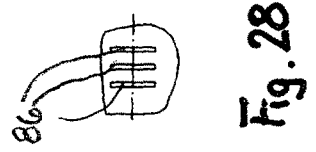
Figure 27:
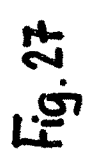

The penetrations 86 can have different shapes. In FIGS. 27 to 29, possible design shapes of these penetrations are illustrated in an exemplary fashion only.

According to FIG. 27, the penetrations 86 have a circular cross section. In the radially inner region 10 of the dissipation body 8, the penetrations 86 are positioned at a spacing behind one another in circumferential direction. In this context, the penetrations 86 have sufficient spacing from the end face 88 of the dissipation body 8.

In the embodiment according to FIG. 28, the penetrations 86 are configured as elongate, radially extending slots which at least partially, advantageously completely, are filled with the electrically conductive material 87. The slot-shaped penetrations 86 are also uniformly distributed about the circumference of the dissipation body 8 and have a sufficient spacing from the end face 88 of the dissipation body 8.

In the embodiment according to FIG. 29, the penetrations 86 are of a corrugated shape and are arranged to substantially extend in radial direction. These penetrations 86 are also distributed at uniform spacings about the circumference of the dissipation body 8.

FIGS. 27 to 29 show only in an exemplary fashion possible configurations of the penetrations 86 without the illustrated shapes of the penetrations 86 having to be viewed as being limiting. Important is that the penetrations 86 at least partially, advantageously completely, are filled with the electrically conductive material 87 so that the two sides 84, 85 of the coating 83 are connected electrically conductively with each other.

In the described embodiment, the coating 83 is applied onto the elastic base body 82 and is produced of a highly conductive material. By means of the penetrations 86, the two sides 84, 85 of the coating 83 are conductively connected with each other.

The penetrations 86 are provided in such a way on the radially inner region 10 of the dissipation body 8 that in the contact region of this region 10 of the dissipation body 8 they are resting against the motor shaft 68. In case the coating on the side 85 should wear upon extended duration of use of the shaft-grounding ring, the electrically conductive material 87 in the penetrations 86 will then come into contact with the motor shaft 68. In this case, the induced voltages can be dissipated through the material 87 in the penetrations 86, through the material on the oppositely positioned side 84, and from there into the holding ring 79. Since the penetrations 86 penetrate the base body 82, the dissipation of the induced voltages is ensured even when, after removal of the conductive material at the side 85, the base body 82 is also subjected to wear. Accordingly, in a constructively very simple way it is ensured that during the entire service life of the dissipation body 8 the induced voltages can be dissipated away from the motor shaft 68 in a reliable way.

In a further embodiment (not illustrated), the dissipation body 8 can also be provided without the penetrations 86. In this case, the dissipation body 8 only comprises the base body 82 with the coating 83.

Furthermore, it is possible to provide the base body 82 with a coating 83 only on the side 84 while the oppositely positioned side 85 that is facing the motor shaft 68 has no coating. Instead, in the base body 82 the penetrations 86 are provided with the conductive material 87. In this case, the voltages are dissipated away from the motor shaft 68 through the materials 87 located in the penetrations 86 into the coating 83 on the side 84 and from there into the holding ring 79. From here, the dissipation takes place in a suitable way into the housing 69. The holding ring 79 is mounted in the installation space 70 of the housing 69 in such a way that the dissipation of the voltages into the grounded housing 69 is ensured. The penetrations 86 are provided such that the voltages can be dissipated reliably away from the motor shaft 68 in the described way. Since the base body 82 is penetrated by the penetrations 86, the contact of the conductive material 87 in the penetrations 86 with the motor shaft 68 still exists even when the base body 82 should wear in its radial inner region 10 resting on the motor shaft.

The shapes of the penetrations 86 which have been described in connection with FIGS. 27 to 29 in an exemplary fashion can be provided also in combination with each other at the dissipation body 8.

FIGS. 30 and 31 shown an embodiment in which the dissipation body 8 is in principle of the same configuration as in the embodiment according to FIGS. 25 and 26. The dissipation body 8 has the elastically deformable annular disk-shaped base body 82 which is completely covered by the coating 83. In the radially inner region 10 with which the dissipation body 8 is resting against the shaft 68, the penetrations 86 are provided which are at least partially filled with electrically conductive material 87. The penetrations 86 can have a configuration as it has been described with the aid of the preceding embodiment.

In contrast to the preceding embodiment, the base body 82 on its side 84 which is facing away from the shaft 68 is provided with a surface structure 89. It is provided across the entire radial width and across the entire circumference of the base body 82. The surface structure 89 can be formed, for example, by grooves that adjoin each other, for example, in radial direction and extend about the circumference of the base body 82. FIGS. 30 and 31 also show that these grooves extend, for example, across half the thickness of the base body 82.

The electrically conducting material is applied onto the side 84 of the base body 82 such that the surface structure 89 at least partially, advantageously completely, is filled and a continuous coating on the side 84 results.

Since the surface structures 89 are formed by depressions in the side 84 of the base body 82, a particularly good dissipation of the induced voltages away from the motor shaft 68 is ensured. The penetrations 86 have such a size that the conductive material 87 contained therein is in any case in contact with the electrically conductive material contained in the surface structure 89. Moreover, the electric conductivity is significantly improved by the base body 82 with the electrically conductively filled surface structures 89.

This embodiment is also characterized in that the dissipation body 8 has a long service life across which the dissipation of the induced voltages away from the motor shaft 68 is ensured to a high degree.

The dissipation body 8, as has been described with the aid of the preceding embodiment, can also be configured without the penetrations 86. Furthermore, it is possible not to coat the base body 82 with conductive material on the side 86 which is facing the shaft 68 so that in this case the dissipation of the voltage is realized through the conductive material 87 in the penetrations 86 in the described way.

The geometric cross section of the penetrations 86 is selected in the embodiments according to FIGS. 25 to 31 such that a preferred contact surface relative to the rotating shaft 68 results with the conductive material and remains almost constant across the service life of the shaft-grounding ring, even when the surrounding material of the coating and/or the base body 82 will wear. The fastening of the disk-shaped dissipation body 8 can also be realized in accordance with the afore described embodiments by means of two clamping disks or clamping rings, as has been explained in an exemplary fashion with the aid of FIGS. 1 to 3. Also, the dissipation body 8 in accordance with the embodiment according to FIGS. 20 and 21 can be mounted such that it is not contacting the shaft 68 but the inner wall 71 of the installation space 70 of the grounded housing 69.

Furthermore, it is possible to use the dissipation body according to FIGS. 25 to 31 in an exemplary fashion in a paired arrangement, as has been explained in an exemplary fashion with the aid of FIGS. 4 and 5.

In principle, it is possible to use the dissipation body according to FIGS. 25 to 31 in all embodiments according to FIGS. 1 to 24.

Figure 32:
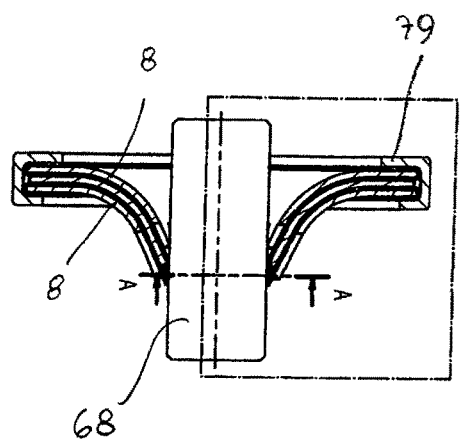
Figure 33:
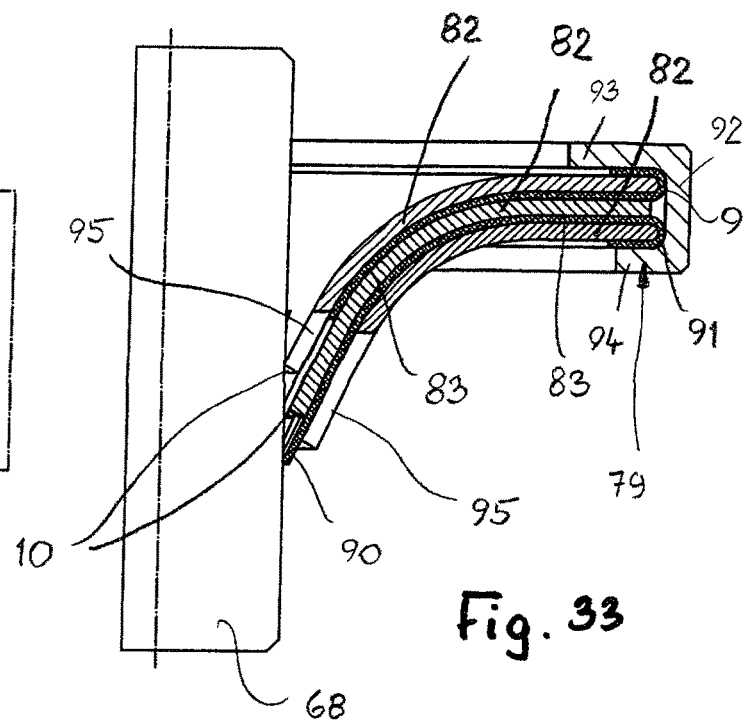
Figure 34:
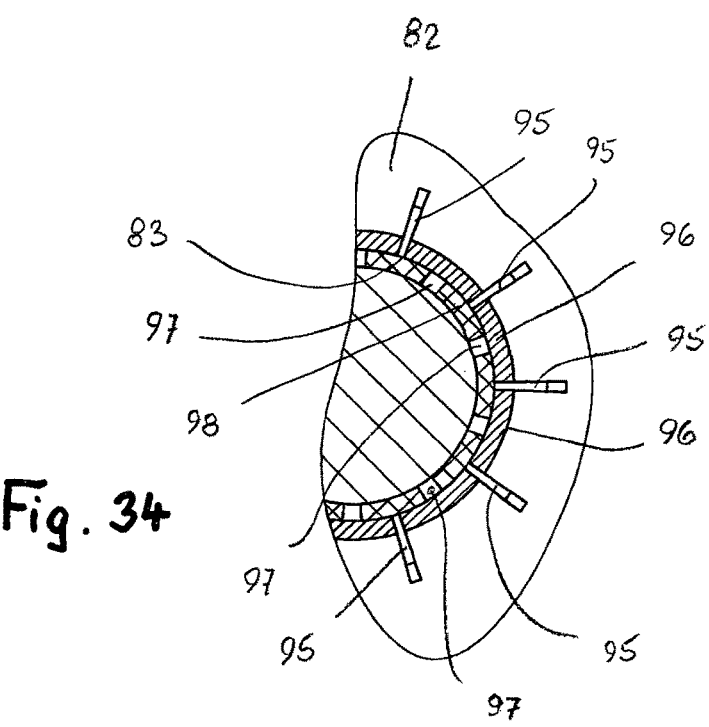

FIGS. 32 to 34 show a shaft-grounding ring which comprises three annular disk-shaped base bodies 82 comprised of elastic material that can be comprised of PTFE, elastomers or other suitable materials. These materials can be conductive, hardly conductive, or non-conductive. The base bodies 82 are separated from each other by electrically conductive foils which form the coatings 83 of the base bodies 82. The coatings 83 are also embodied with an annular disk-shape and are comprised of an electrically conductive material. In the installation position, the coatings 83 with their radially inner region 90 are resting with a radial pretension force against the motor shaft 68.

The coatings 83 engage in a U-shape with their radial outer region 91 about the two terminal base bodies 82 (FIG. 33). The central base body 82 is covered on both sides completely by the coatings 83. The base body 82 which is facing the motor shaft 68 is covered only within a narrow region at the outer circumference by the coating 83 (foil) at its side facing the motor shaft 68. On the other hand, the outer base body 82 which is facing away from the motor shaft 68 is covered only in a narrow region at the outer circumference by the coating 83 (foil) at its side which is facing away from the motor shaft 68.

The package of the base bodies 82 and the coatings 83 positioned therebetween is clamped at the outer rim by the holding ring 79 which is comprised of electrically conductive material. The holding ring 79 has an approximately U-shaped cross section and is configured such that the base body 82 and the coatings 83 are compressed. The coatings 83 are resting with their regions which enclose the outer rims of the two outer base bodies 82 against the stay 92 and with their two outer radially short sections against the legs 93, 94 of the holding ring 79.

The shaft-grounding ring is designed such that the base bodies 82 with their radially inner rim 10 are contacting the motor shaft 68. The coatings 83 are also configured such that with their rim 90 they are resting with radial pretension force against the motor shaft 68. In this way, the induced voltages can be dissipated away from the motor shaft 68 through the coatings 83 to the holding ring 79 which serves as a clamping ring from which these voltages are then dissipated in the described way into the housing 69 that is not illustrated (FIG. 22).

The obtainable electric resistance can be simply adjusted by means of the number of the foil-type coatings 83 and the size of the contact surface of the coatings 83 relative to the motor shaft 68.

The base bodies 82 are provided along their inner circumference with slots 95 which extend advantageously radially away from the inner rim and are uniformly distributed about the circumference. Between the neighboring slots 95 tongues 96 are formed which ensure a reliable contact of the base bodies 82 at the motor shaft 68.

Advantageously, also the coatings 83 (foils) are provided at the radially inner rim with slots 97 which extend advantageously away from the radial inner rim in radial direction. Between the slots 97 tongues 98 are formed which also ensure a proper contact of the coatings 83 at the motor shaft 68. In this way, it is ensured that the induced voltages are dissipated reliably away from the motor shaft 68.

It is advantageous when the slots 95 of the base bodies 82 in circumferential direction are positioned displaced relative to the slots 97 of the coatings 83. This optional displacement can be provided such that the slots 97 of the coatings 83 are positioned centrally between the slots 95 of the base bodies 82, viewed in radial direction.

As electrically conductive coating 83, for example, copper foils can be used. Such foils have a thickness of, for example, only approximately 0.04 mm so that they can be used also for shaft-grounding rings with small dimensions. Also, the base bodies 82, which form together with the respective coatings 83 the dissipation bodies 8, have only minimal thicknesses. For example, disk-shaped base bodies 83 comprised of PTFE have only thicknesses within the magnitude of approximately 0.3 mm.

With this embodiment the induced voltages on the motor shaft 68 can also be reliably dissipated. Even when the base body 82 wears over time, the electrically conductive coatings 83 are always in contact with the motor shaft 68 so that during the entire service life of the shaft-grounding ring a reliable dissipation of the induced voltages is ensured.

Instead of the holding ring 79 described as an example, the base bodies 82 and coatings 83 can also be fastened in accordance with other embodiments. Important is the good contact (very minimal electrical resistance) to the housing. In deviation from the illustrated embodiment, the shaft-grounding ring can also comprise fewer or more than three base bodies 82 with the corresponding number of coatings 83 (foils).

In the described embodiments, the dissipation bodies 8, 8*a*, 29 are advantageously manufactured of an electrically conductive compact material that is chemically and thermally resistant and causes only minimal friction. In this context, electrically conductive PTFE is considered a preferred material. The dissipation bodies 8, 8*a*, 29 can also be comprised, for example, of an elastomer matrix into which electrically conductive fillers are introduced in a sufficient quantity. The shaft-grounding rings dissipate the induced voltages safely away from the shaft 68 to the grounded housing 69. When a plurality of dissipation bodies are combined to a package, the dissipation capability for the induced voltages away from the shaft 68 is improved. In particular when the dissipation bodies are comprised of conductive PTFE, no or only insignificant soiling occurs in use of the shaft-grounding rings. This is in particular advantageous when the shaft-grounding rings are used together with sealing systems with which the shaft 68 is sealed and which would be impaired by soiling.

In all embodiments, in particular in the embodiments according to FIGS. 25 to 34, resistance values between the motor shaft 68 and the grounded housing 69 of significantly less than 1Ω are achieved. Even resistance values of less than 0.01Ω are achievable.

What is claimed is:

1. A shaft-grounding ring for dissipating induced voltages or electric charges away from a first machine element into a second machine element, the shaft-grounding ring comprising:
    an annular housing comprised of electrically conductive material and configured to be conductively connected to the first machine element;
    at least one first dissipation element comprised of an electrically conductive material, wherein the at least one first dissipation element is electrically conductively connected to the annular housing and is configured to be electrically conductively connected to the second machine element;
    wherein the at least one first dissipation element is a disk-shaped dissipation body extending at least over a portion of a circumference of the at least one first dissipation element;
    wherein two or more of said at least one first dissipation element are combined to a package of dissipation elements, wherein the shaft-grounding ring further comprises a spring element resting against one side of the package of dissipation elements, wherein the spring element has at least approximately a same shape and a same size as the two or more of said first dissipation elements.

2. A shaft-grounding ring according for dissipating induced voltages or electric charges away from a first machine element into a second machine element, the shaft-grounding ring comprising:
    an annular housing comprised of electrically conductive material and configured to be conductively connected to the first machine element;
    at least one first dissipation element comprised of an electrically conductive material, wherein the at least one first dissipation element is electrically conductively connected to the annular housing and is configured to be electrically conductively connected to the second machine element;
    wherein the at least one first dissipation element is a disk-shaped dissipation body extending at least over a portion of a circumference of the at least one first dissipation element;
    wherein the at least one first dissipation element is clamped across more than half of a radial width of the at least one first dissipation element between a clamping element and a base body, wherein the clamping element is arranged within the annular housing and is fixedly electrically conductively connected to the annular housing.

3. The shaft-grounding ring according to claim 2, wherein the at least one first dissipation element is an electrically conductive PTFE element positioned in a radial plane of the shaft-grounding ring.

4. The shaft-grounding ring according to claim 2, wherein the at least one first dissipation element comprises an elastically bent rim region resting against the first machine element or the second machine element, wherein the elastically bent rim region comprises cutouts distributed about a circumference of the elastically bent rim region and open at a rim of the elastically bent rim region.

5. The shaft-grounding ring according to claim 4, wherein the cutouts are slots.

6. The shaft-grounding ring according to claim 2, wherein the at least one first dissipation element comprises a radially inner rim region and is electrically conductively connected with elastic deformation of the radially inner rim region to the first machine element or the at least one first dissipation element comprises a radially outer rim region and is electrically conductively connected with elastic deformation of the radially outer rim region to the second machine element.

7. The shaft-grounding ring according to claim 2, wherein the base body is embodied as one piece together with the annular housing and is comprised of electrically conductive material.

8. The shaft-grounding ring according to claim 2, wherein the clamping element is loaded by a spring force against the at least one first dissipation element.

9. The shaft-grounding ring according to claim 2, further comprising a bushing, wherein the base body is part of the bushing, wherein the bushing is comprised of electrically conductive material and is connected fixedly to the first machine part.

10. The shaft-grounding ring according to claim 9, wherein the at least one first dissipation element is resting against the bushing and against the annular housing.

11. The shaft-grounding ring according to claim 9, wherein the at least one first dissipation element comprises a radial inner region resting on a conical section of the bushing and is force-loaded in a direction toward the conical section of the bushing.

12. The shaft-grounding ring according to claim 2, wherein the clamping element comprises projections configured to press the clamping element against the at least one first dissipation element.

13. The shaft-grounding ring according to claim 12, wherein the clamping element is a clamping plate that is fastened to the annular housing, wherein the projections are formed by a stamping process.

14. The shaft-grounding ring according to claim 2, wherein the at least one first dissipation element is of a one piece configuration.

15. The shaft-grounding ring according to claim 2, wherein the at least one first dissipation element is comprised of a plurality of larger sections.

16. The shaft-grounding ring according to claim 2, wherein the at least one first dissipation element is comprised of a compact electrically conductive material.

17. A shaft-grounding ring further comprising for dissipating induced voltages or electric charges away from a first machine element into a second machine element, the shaft-grounding ring comprising:
   an annular housing comprised of electrically conductive material and configured to be conductively connected to the first machine element;
   at least one first dissipation element comprised of an electrically conductive material, wherein the at least one first dissipation element is electrically conductively connected to the annular housing and is configured to be electrically conductively connected to the second machine element;
   at least one second dissipation element arranged in the annular housing, wherein the at least one first dissipation element and the at least one second dissipation element are separated from each other by at least one intermediate disk comprised of electrically conductive material;
   wherein the at least one first dissipation element is a disk-shaped dissipation body extending at least over a portion of a circumference of the at least one first dissipation element.

18. The shaft-grounding ring according to claim 17, wherein two or more of said at least one first dissipation element are combined to a first package of dissipation elements and wherein two or more of said at least one second dissipation element are combined to a second package of dissipation elements, wherein the first package of dissipation elements and the second package of dissipation elements are separated from each other by the at least one intermediate disk comprised of electrically conductive material.

19. A shaft-grounding ring for dissipating induced voltages or electric charges away from a first machine element into a second machine element, the shaft-grounding ring comprising:
   an annular housing comprised of electrically conductive material and configured to be conductively connected to the first machine element;
   at least one first dissipation element comprised of an electrically conductive material, wherein the at least one first dissipation element is electrically conductively connected to the annular housing and is configured to be electrically conductively connected to the second machine element;
   wherein the at least one first dissipation element is a disk-shaped dissipation body extending at least over a portion of a circumference of the at least one first dissipation element;
   wherein the at least one first dissipation element comprises an elastically deformable disk-shaped base body provided with a coating of electrically conductive material.

20. The shaft-grounding ring according to claim 19, wherein the coating completely envelopes the disk-shaped base body.

21. The shaft-grounding ring according to claim 19, wherein the disk-shaped base body comprises a contact region configured to contact the first machine element or the second machine element, wherein the contact region comprises penetrations distributed about a circumference of the disk-shaped base body and filled with an electrically conductive filler material.

22. The shaft-grounding ring according to claim 21, wherein the electrically conductive filler material is connected to the coating at least at a side of the disk-shaped base body that is facing away from the first machine element or the second machine element.

23. The shaft-grounding ring according to claim 19, wherein the coating is an electrically conductive foil extending from a first side of the disk-shaped base body across an outer rim of the disk-shaped base body to a second side of the disk-shaped base body.

24. The shaft-grounding ring according to claim 19, wherein the coating is an electrically conductive foil positioned between the base bodies of two of said at least one first dissipation elements neighboring each other.

* * * * *